US011860822B2

(12) United States Patent
Wood et al.

(10) Patent No.: US 11,860,822 B2
(45) Date of Patent: Jan. 2, 2024

(54) IMMUTABLE LEDGER WITH EFFICIENT AND SECURE DATA DESTRUCTION, SYSTEM AND METHOD

(71) Applicant: LUTHER SYSTEMS US INCORPORATED, Los Gatos, CA (US)

(72) Inventors: Samuel Wood, Los Gatos, CA (US); Bryan Matsuo, Los Gatos, CA (US); Hossein Kakavand, Los Gatos, CA (US)

(73) Assignee: LUTHER SYSTEMS US INCORPORATED, Los Gatos, CA (US)

( * ) Notice: Subject to any disclaimer, the term of this patent is extended or adjusted under 35 U.S.C. 154(b) by 544 days.

(21) Appl. No.: 16/689,006

(22) Filed: Nov. 19, 2019

(65) Prior Publication Data

US 2020/0159697 A1 May 21, 2020

Related U.S. Application Data

(60) Provisional application No. 62/769,404, filed on Nov. 19, 2018.

(51) Int. Cl.
*G06F 16/00* (2019.01)
*G06F 16/16* (2019.01)
(Continued)

(52) U.S. Cl.
CPC ........ *G06F 16/162* (2019.01); *G06F 16/1837* (2019.01); *G06Q 20/3674* (2013.01); *G06Q 20/3678* (2013.01); *H04L 9/0637* (2013.01)

(58) Field of Classification Search
CPC .... G06F 16/162; G06F 16/1837; G06F 16/14; G06Q 20/3674; G06Q 20/3678;
(Continued)

(56) References Cited

U.S. PATENT DOCUMENTS 5,680,611 A 10/1997 Rail et al.
5,696,898 A 12/1997 Baker
(Continued)

FOREIGN PATENT DOCUMENTS

| GB | 2571390 | 8/2019 |
| WO | 2015/171580 | 12/2015 |
| WO | WO2018201009 A1 | 11/2018 |

OTHER PUBLICATIONS

Kakavand et al. "The blockchain revolution: An analysis of regulation and technology related to distributed ledger technologies." Oct. 12, 2016 (Oct. 12, 2016), 27 pages. Retrieved from: https://papers.ssrn.com/sol3/papers.cfm?abstract_id=2849251.
(Continued)

*Primary Examiner* — Diedra McQuitery
(74) *Attorney, Agent, or Firm* — Manatt, Phelps & Phillips, LLP

(57) ABSTRACT

A system and method for destroying data stored on an immutable distributed ledger utilizes technology from the following fields: encryption, digital signatures, data structures, distributed storage, distributed ledger technology, and smart contracts. Immutable distributed ledgers provide benefits for sensitive data, including availability, integrity, and data processing visibility. The system and method places sensitive data on an immutable distributed ledger and maintains these advantages of immutable distributed ledgers. The system and method also supports the efficient deletion of this sensitive data without compromising the integrity of the ledger.

24 Claims, 11 Drawing Sheets

(51) Int. Cl.
   *G06F 16/182* (2019.01)
   *G06Q 20/36* (2012.01)
   *H04L 9/06* (2006.01)

(58) Field of Classification Search
   CPC .. G06Q 20/02; G06Q 2220/00; H04L 9/0637; H04L 9/3239; H04L 9/3247; H04L 9/3297; H04L 67/1097; H04L 2209/38; H04L 9/0643
   See application file for complete search history.

(56) References Cited

U.S. PATENT DOCUMENTS

| | | | |
|---|---|---|---|
| 5,892,900 | A | 4/1999 | Ginter et al. |
| 8,918,890 | B2 | 12/2014 | Nakazawa |
| 10,075,298 | B2 | 9/2018 | Struttman |
| 10,579,974 | B1 | 3/2020 | Reed |
| 11,126,975 | B2 | 9/2021 | Haldenby et al. |
| 11,159,306 | B2 * | 10/2021 | Ow ................. H04L 63/1416 |
| 11,223,877 | B2 | 1/2022 | Madiesetti |
| 2002/0120682 | A1 | 8/2002 | Funaki |
| 2003/0233357 | A1 | 12/2003 | Merenda |
| 2007/0239589 | A1 | 10/2007 | Wilson, Jr. et al. |
| 2015/0221034 | A1 | 8/2015 | Nyhoff et al. |
| 2015/0244690 | A1 | 8/2015 | Mossbarger |
| 2015/0332283 | A1 | 11/2015 | Witchey |
| 2015/0379510 | A1 | 12/2015 | Smith |
| 2016/0028552 | A1 | 1/2016 | Spanos |
| 2016/0357550 | A1 | 12/2016 | Thomas et al. |
| 2017/0048217 | A1 | 2/2017 | Biggs et al. |
| 2017/0075938 | A1 | 3/2017 | Black et al. |
| 2017/0091750 | A1 | 3/2017 | Maim |
| 2017/0103385 | A1 | 4/2017 | Wilson, Jr. et al. |
| 2017/0103468 | A1 | 4/2017 | Orsini et al. |
| 2017/0126702 | A1 * | 5/2017 | Krishnamurthy ..... G06F 21/604 |
| 2017/0193619 | A1 | 7/2017 | Rollins et al. |
| 2018/0307859 | A1 * | 10/2018 | LaFever ................. H04L 63/20 |
| 2018/0341648 | A1 | 11/2018 | Kakavand et al. |
| 2018/0341678 | A1 | 11/2018 | Moerkotte et al. |
| 2019/0156923 | A1 * | 5/2019 | Kain ..................... G06F 16/958 |
| 2019/0286102 | A1 | 9/2019 | Carbone |
| 2019/0303892 | A1 | 10/2019 | Yantis |
| 2019/0305938 | A1 * | 10/2019 | Sandberg-Maitland .................... H04L 9/0897 |
| 2019/0327082 | A1 * | 10/2019 | Ow ........................ H04L 9/0637 |
| 2019/0333054 | A1 * | 10/2019 | Cona ..................... G06Q 20/383 |
| 2019/0361842 | A1 | 11/2019 | Wood et al. |
| 2020/0092088 | A1 * | 3/2020 | Novotny ............... H04L 9/0894 |
| 2020/0111092 | A1 | 4/2020 | Wood et al. |
| 2020/0201964 | A1 * | 6/2020 | Nandakumar .......... G06F 21/64 |
| 2021/0056070 | A1 | 2/2021 | Kakavand et al. |
| 2021/0075623 | A1 * | 3/2021 | Petersen ................... H04L 9/50 |
| 2021/0174432 | A1 | 6/2021 | Gonnaud |

OTHER PUBLICATIONS

Kosba et al. "Hawk: The blockchain model of cryptography and privacy-preserving smart contracts." In: IEEE symposium on security and privacy. May 26, 2016 (May 26, 2016), 20 pages. Retrieved from: https://ieeexplore.ieee.org/stamp/stamp.jsp?tp=&arnumber=7546538.

Peters et al., "Understanding modern banking ledgers through blockchain technologies: Future of transaction processing and smart contracts on the internet of money." In: Banking Beyond Banks and Money. Nov. 18, 2015 (Nov. 18, 2015), 33 pages. Retrieved from: https://arxiv.org/pdf/1511.05740.pdf.

Hassan et al., "Blockchain and the Future of the Internet: A Comprehensive Review," Information Technology University (ITU), Punjab, Pakistan, Feb. 23, 2019, 21 pages. Retrieved from: https://arxiv.org/pdf/1904.00733.pdf.

Reed, "Distributed Intelligent Agents System and Method for Securely Operating a Digital Virtual Currency", U.S. Appl. No. 62/116,853, filed Feb. 16, 2015.

Esposito et al., "Blockchain: A Panacea for Healthcare Cloud-Based Data Security and Privacy?", IEEE Cloud Computing, vol. 5, Jan./Feb. 2018, pp. 31-37 (8 pages).

Manber, Udi, entitled, "Finding Similar Files in a Large File System," TR 93-33—1994 Winter USENIX Technical Conference, Department of Computer Science, The University of Arizona, Tucson, Arizona, (Oct. 1993), 11 pages.

The Intel Xeon Scalable—A Truly Big Day for the Data Center, Intel's Newest Platform Designed for the Data Center is Its Highest Performance, Most Versatile Ever, Jul. 11, 2017, 5 pages.

Ali, Robert et al., entitled, "Innovation in payment technologies and the emergence of digital currencies," Quarterly Bulletin, (2014) Q3, pp. 262-275.

Vipula, Rawte et al., entitled, "Fraud Detection in Health Insurance Data Mining Techniques," 2015 International Conference on Communication, Information & Computing Technology (ICCICT), (Jan. 16-17, 2015), 6 pp.

Bahmani, Raad et al., entitled, "Secure Multiparty Computation from SGX," 38 pp.

BitFury Group, entitled, "Proof of Stake versus Proof of Work," White Paper, (Sep. 13, 2015), pp. 1-26.

Bloom, Burton H. , entitled, "Space/Time Trade-offs in Hash Coding with Allowable Errors," Communications of the ACM, (Jul. 1970), vol. 13, No. 7, pp. 422-426.

Doerner, Jack, entitled, "An Introduction to Practical Multiparty Computation," 53 pp.

Fan, Li et al. , entitled, "Summary Cache: A Scalable Wide-Area Web Cache Sharing Protocol," IEEE/ACM Transactions on Networking, (Jun. 2000),. vol. 8, No. 3., pp. 281-293.

"Intel$^R$ Software Guard Extension (SGC) Remote Attestation End-To-End Sample," GitHub, (2018), 9 pp.

O'Keeffe, Dan et al., entitled, "Spectre-attack-sgx," GitHub, (2018), 2 pp.

Kakavand, Hossein et al., entitled, "The Blockchain Revolution: An Analysis of Regulation and Technology Related to Distributed Ledger Technologies," 27 pp.

Kwon, Jae, entitled, "Tendermint: Consensus without Mining," Draft v.0.6., pp. 1-11.

Lamport, Leslie et al., entitled, "The Byzantine Generals Problem," ACM Transactions on Programming Languages and Systems, (Jul. 1982), vol. 4, No. 3, pp. 382-401.

Manber, Udi, entitled, "Finding Similar Files in a Large File System," 1994 Winter USENIX Technical Conference, (Oct. 1993), 1-10 pp.

Nakamoto, Satoshi, entitled, "Bitcoin: A Peer-to-Peer Electronic Cash System," pp. 1-9.

Pilkington, Marc, entitled, "Blockchain Technology: Principles and Applications," Blockchain Technology: Principles and Applications, 39 pp.

Pinkas, Benny et al., entitled, "Phasing: Private Set Intersection using Permutation-based Hashing," Usenix Security, (2015) PSSZ15, pp. 1-21.

Rindal, Peter et al., entitled, "Improved Private Set Intersection against Malicious Adversaries," (Oct. 3, 2016), pp. 1-18.

"Summary of the HIPAA," Health Information Privacy, U.S. Department of Health and Human Services, (2013), pp. 8.

"The Intel Xeon Scalable—A Truly Big Day for the Data Center," (Jul. 11, 2017), 5 pp.

Clack et al., entitled, "Smart Contract Templates: essential requirements and design options." In: arXivpreprint. Dec. 15, 2016 (Dec. 15, 2016) Retrieved from <https://arxiv.org/pdf/1612.04496.pdf> entire document.

Yaga, et al., "Blockchain Technology Overview", NIST.IR. 8202, Oct. 2018, https://doi.org/10.6028/NIST.IR.8202, 68 pgs.

Keritsis, U.S. Appl. No. 16/383,720, Notice of Allowance and Fees Due (PTOL-85), dated Oct. 25, 2021, 9 pgs.

Selimi, et al., "Towards Blockchain-enabled Wireless Mesh Networks", CryBlock '18, Jun. 15, 2018, Munich, Germany, 6 pages.

* cited by examiner

```
{
 "Requests": [{
   "Birthday": "17/Jan/1706",
   "Name": "Ben Franklin",
   "RequestID": "e24e8858-9de3-11e8-98d0-529269fb1459"
  },{
   "Birthday": "13/Apr/1743",
   "Name": "Tom Jefferson",
   "RequestID": "f5e26dbc-9de3-11e8-98d0-529269fb1459"
  }]
}
```

FIG. 9

```
[{
 "context_path": ".Requests[0]",
 "header": {
   "compressor": "zlib",
   "encryptor": "AES-256",
   "private_paths": [".Name",".Birthday"],
   "profile_paths": [".Name"]
  }
 },{
 "context_path": ".Requests[1]",
 "header": {
   "compressor": "zlib",
   "encryptor": "AES-256",
   "private_paths": [".Name",".Birthday"],
   "profile_paths": [".Name"]
  }
 }]
```

FIG. 10

```
{
 "mxf": "v1",
 "message": {
  "Requests": [{
    "RequestID": "e24e8858-9de3-11e8-98d0-529269fb1459"
   },{
    "RequestID": "f5e26dbc-9de3-11e8-98d0-529269fb1459"
  }]
 },
 "transforms": [{
   "context_path": ".Requests[0]",
   "header": {
    "compressor": "zlib",
    "encryptor": "AES-256",
    "private_paths": [".Name",".Birthday"],
    "profile_paths": [".Name"]
   },
   "body": {
    "dsid": "4944427072",
    "encrypted_base64": "MDEyMzQ1Njc4OUFCQ0RFRqk2DQjF9hoFgmmvRf5QFDzz9cw8rEzDCwSOPOceQ4gDeGwHKQC3RTWhgg=="
   }
  },{
   "context_path": ".Requests[1]",
   "header": {
    "compressor": "zlib",
    "encryptor": "AES-256",
    "private_paths": [".Name",".Birthday"],
    "profile_paths": [".Name"]
   },
   "body": {
    "dsid": "2355237171",
    "encrypted_base64": "QUJDREVGMDEyMzQ1Njc4ORx3PFG5/IIW4txDz6pH/mQVqk1i8Il7CfppDQaQHqT/gY4VwIB4V//Rpnk="
   }
  }]
}
```

FIG. 11

```
base64-encode(
 AES256-encrypt(
  zlib-compress(

// Private Message:
   to-bytes('["Ben Franklin", "17Jan1706"]')
  ),

// Secret Key:
  to-bytes("Here I stand, I can do no other,"),

// Initialization Vector (IV):
  to-bytes("0123456789ABCDEF")
 )
) == "MDEyMzQ1Njc4OUFCQ0RFRqk2DQjF9hoFgmmvRf5QFDzz9cw8rEzDCwSOPOceQ4gDeGwHKQC3RTWhgg=="

to-string(
 AES256-decrypt(
  zlib-decompress(
   base64-decode(

// Encrypted Message:
    "MDEyMzQ1Njc4OUFCQ0RFRqk2DQjF9hoFgmmvRf5QFDzz9cw8rEzDCwSOPOceQ4gDeGwHKQC3RTWhgg=="
   )
  ), // Secret Key: (IV included in encrypted message)
  to-bytes("Here I stand, I can do no other,")
 )
) == '["Ben Franklin", "17Jan1706"]'
```

IMMUTABLE LEDGER WITH EFFICIENT AND SECURE DATA DESTRUCTION, SYSTEM AND METHOD

RELATED APPLICATIONS

This application claims the benefit under 35 USC 119(e) of U.S. Provisional Application No. 62/769,404, filed Nov. 19, 2018, and which is incorporated herein by reference.

APPENDIX

Appendix A (4 pages) contains a glossary that forms part of the specification.

FIELD

The disclosure relates to the destruction of data stored on an immutable distributed ledger. The system and method utilizes technology from the following fields: encryption, data erasure, digital signatures, data structures, distributed storage, distributed ledger technology, and smart contracts.

BACKGROUND

Many industries, especially finance and insurance, are adopting distributed ledger and blockchain technologies to automate business processes. Specifically, these technologies enable untrusted and semi-trusted participants to securely and jointly execute a process using software known as Smart Contracts that run on these platforms. A common and key technological design choice that underpins the security of these technologies is an immutable, or append-only, distributed ledger. However, by design an immutable ledger does not readily provide a way for data that is stored or processed by the ledger to be deleted. Existing approaches to deletion of data on these systems compromises the integrity, availability, visibility, and other security benefits of these systems. The immutability design choice of these systems often conflicts with corporate and government information security policies and regulation which have strict data retention policies, e.g., where certain sensitive data must be periodically destroyed. For example, the recent General Data Protection Regulation (GDPR) which has come into effect throughout the European Union contains provisions that require systems to delete personally identifiable information (PII) for processed individuals in some situations (e.g., in response to "right to be forgotten" requests). As a result of the gap between the technology capabilities and policy requirements, some organizations are choosing not to adopt blockchain technology for systems that process sensitive data.

Recently, new enterprise applications are adopting blockchain architectures to enable untrusted, and possibly malicious, participants to securely execute processes and share private data. We briefly overview blockchain system architecture for permissioned (private) networks.

In general, a blockchain is a digital platform that stores and verifies the entire history of transactions between users across a network in a tamper- and revision-proof way. It is also the underlying database structure for digital currency transactions including in the Bitcoin and Ethereum networks. The paper "Bitcoin: A peer-to-peer electronic cash system" (Nakamoto, 2009) is incorporated into this application by reference. Transactions between users or counterparties are broadcast across the network, verified by cryptographic algorithms, and grouped into blocks. Each new block is subsequently verified by nodes in the network. As part of the verification process, nodes verify that the candidate block contains a cryptographically secure reference to the previous block. This reference is used to detect and prevent alterations to the order and history of transactions. Through these references, nodes create, verify, and store chains of blocks, or maintain a "blockchain". For example, each node participating in the Bitcoin network has its own copy of the blockchain, which is synchronized with other nodes using a peer-to-peer protocol ("Proof of Stake versus Proof of Work", White Paper, Bitfury Group Limited, Sep. 13, 2015). This "removes the need for a central authority and thus for participants to have confidence in the integrity of any single entity." ("Innovations in payment technologies and the emergence of digital currencies", Robleh Ali, 2014). Blockchain technologies enable multiple organizations and groups within an organization to efficiently process transactions and securely reach consensus without the requirement of a third party ("The Blockchain Revolution: An Analysis of Regulation and Technology Related to Distributed Ledger Technologies", H. Kakavand, N. Kost De Sevres, Commissioner B. Chilton).

Fundamentally, blockchain and distributed ledger technologies (DLT), consist of a network of nodes that execute protocols to maintain a consistent ledger(s), where nodes are possibly owned and operated by organizations that do not trust one another. Unlike traditional distributed databases, with these technologies there is not a requirement for a central authority that manages a database, but instead peers manage their own databases by running software that executes consensus protocols to reconcile their ledgers. Recently, the industry has adopted a taxonomy where the general term "Distributed Ledger Technology (DLT)" describes systems that adopt this general architecture (described in more detail in "Thoughts on the taxonomy of blockchains & distributed ledger technologies", Colin Platt, Medium, Feb. 27, 2017 available at //medium.com/@colin_/thoughts-on-the-taxonomy-of-blockchains-distributed-ledger-technologies-ecad1c819e28 that is incorporated herein by reference), and the term "blockchain" is used to describe a narrow, or specific type of DLT. This taxonomy is not universally agreed upon and some use the term "blockchain" to either 1) only refer to cryptocurrency networks such as Bitcoin, 2) only refer to systems where every node has access to every (possibly encrypted or confidential) transactions and block, or 3) only refer to systems that maintain a distributed merkle tree.

In particular, the R3 organization describes its Bitcoin-inspired Corda system as a DLT but not a blockchain. R3 argues for this nomenclature because the Corda network does not maintain a global shared ledger of transactions, nor does Corda use the standard data structures found in other Blockchain-based systems (described in more detail in "Corda: A Distributed Ledger", Mike Hearn, R3, 2016 available at //docs.corda.net/_static/corda-technical-whitepaper.pdf that is incorporated herein by reference). Specifically, Corda does not group transactions into blocks which are replicated and ordered by the network to ensure transaction validity, nor does it use standard cryptographic data structures ("Merkle trees") that form a "chain" of hashes) to achieve transaction immutability. Instead, each Corda peer maintains their own database of transactions known as a vault. In order to prevent double spends and verify transactions, each transaction specifies a notary (specifically, a transaction initiator specifies a notary policy which can include a set of notaries who must sign the transaction in order for it to be valid. This policy may only expose some of the transaction details to the notary in order for them to sign, providing partial transaction confidentiality) that executes the transaction on behalf of the counterparties to ensure that it is valid and has only been executed once (e.g., it is not a double spend). Any node on the network can perform these notary services, however a particular asset must always use the same notary to correctly validate a transaction.

In this document, we adopt the nomenclature used to describe blockchain-based systems, however many of the same concepts and descriptions are common to DLT systems such as R3's Corda. In most cases, the term "blockchain" and DLT can be used interchangeably throughout this document. We describe key blockchain and DLT concepts and terminology below. For a review of blockchain technology concepts and terminology, please see the NIST Report ("NISTIR 8202: Blockchain Technology Overview", D. Yaga, et. al, October 2018" available from //doi.org/10.6028/NIST.IR.8202) which is incorporated into this application by reference.

Blockchain Architecture: Systems that adopt a blockchain architecture typically include components from the following three categories: Blockchain Maintenance (e.g., nodes), Blockchain Interfaces (e.g., clients and oracles), Blockchain "on-chain" Code (e.g., smart contracts or scripts). We describe each of these components below. Smart contracts: are computer protocols that facilitate, verify, or enforce the negotiation or performance of a contract, or that make a contractual clause unnecessary. Smart contracts often emulate the logic of contractual clauses. To develop a smart contract, parts of the terms that make up a traditional contract are implemented in software code and uploaded and executed by nodes that maintain a blockchain network, producing a decentralized smart contract that does not rely on a single trusted third-party for recordkeeping or enforcement. Applications that use Smart Contracts executed on a decentralized network are referred to as decentralized applications, or "DApps". Contractual clauses are automatically executed when pre-programed conditions are satisfied. This eliminates ambiguity regarding the terms of the agreement and disagreement concerning the existence of external dependencies ("The Blockchain Revolution: An Analysis of Regulation and Technology Related to Distributed Ledger Technologies", H. Kakavand, N. Kost De Sevres, Commissioner B. Chilton.)

Transactions: Users submit transactions to nodes using a client. In Bitcoin-based technologies, a transaction is a signed message that includes a script which is executed by nodes to transfer value from one or more addresses to one or more other addresses. In other blockchain technologies including Ethereum and Hyperledger Fabric, a transaction is a signed message used to either deploy a smart contract or send a message to a smart contract which uses the message payload to execute a function and update the nodes' state. Transactions are grouped together by certain nodes into blocks which are also disseminated through the network, validated, and added to each node's blockchain data structure. Specifically, each transaction is validated and processed by each node, where the side effect of transaction processing is the update of a node's local database known as the state database. Each node maintains a copy of their own copy of the state database. In Bitcoin, this database maintains a list of unspent transaction outputs (UTXO) which is used to detect double spending of the Bitcoin currency, and in Ethereum this database also includes values for variables managed by smart contracts. A transaction is said to be confirmed if it is included in a block which has been added to the blockchain, and the corresponding transactions have been executed.

Blockchain Oracles: are off-chain services selected by counterparties that are responsible for sending data and commands to on-chain smart contracts. Oracles are a type of application that has access to the blockchain network and that typically creates transactions to update smart contracts with new data. Where a smart contract's conditions depend upon real world data (e.g., the price of a commodity future at a given time), these agreed-upon outside applications called "oracles" can be developed to monitor and verify prices, performance, or other real world events. For example, the price of an asset at a given time, or the credit default of an entity.

Blockchain Clients: are authenticated applications that provide an interface to the blockchain for users and other applications. In practice, users/counterparties interact with Blockchain clients. The clients deploy smart contracts, create transactions, and query the status of smart contracts running on the blockchain. We refer to the "counterparty client" as the "counterparty". Clients create and update Smart Contracts by submitting transactions to a node on the network. This node subsequently disseminates the transaction to other nodes on the network for verification. The transaction contains a payload, or data, that is stored on the blockchain and passed as input to a contract for subsequent execution.

On-chain Code, or chaincode: certain software code that is executed by nodes on the blockchain network. Many recent blockchain architectures provide a mechanism for nodes to execute smart contracts. Smart contracts are written in chaincode which is a programming language that is supported by the blockchain network. For example, Hyperledger Fabric supports the execution of chaincode written in Go. Chaincode is deployed to the blockchain network by a blockchain client. In many systems, this means that the client creates a deploy transaction that includes the chaincode as its payload. This deploy transaction is stored on the blockchain and subsequently downloaded by nodes for execution. A unique ID is generated for each deployed smart contract which is used by clients to create transactions. Specifically, clients create transactions with payloads, or data, that are sent to the smart contract using this ID, and smart contracts process the data to update their state. This code is written in a smart contract language such as Solidity in Ethereum or Go in Hyperledger Fabric. In Bitcoin, the smart contract language is a domain specific language (DSL) named Bitcoin Script and is limited to only allowing simple payment instructions. Each node runs the chaincode to validate transactions and maintain the integrity of the blockchain. A smart contract reads and writes data that is stored on the blockchain during its execution. This reading and writing of blockchain data by the smart contract is known as on-chain execution. These data are the values of all of the variables within the chaincode and are known as the contract's state. All inputs to the smart contract and outputs must exist in transactions within the blockchain data structure. This requirement, along with the contract's chaincode, allows every node in the network to consistently execute each step of the contract and deterministically compute the same state database.

Different blockchain architectures use different models for managing transaction state, namely 1) stateless or the "unspent transaction output" (UTXO) model, and 2) stateful or the Account Balance model. In many cases one can use a stateful transaction model to emulate a stateless application (described in more detail in Androulaki, Elli, et al. "Hyperledger fabric: a distributed operating system for permissioned blockchains." *Proceedings of the Thirteenth EuroSys Conference*. ACM, 2018 that is incorporated herein by reference), and conversely one can implement stateful "off-chain" smart contracts as a stateful layer on top of a stateless transaction model (described in more detail by Sergio Demian Lerner. "RSK White paper overview" available at.the-blockchain.com/docs/Rootstock-WhitePaper-Overview.pdf. 2015 that is incorporated herein by reference).

Bitcoin and Bitcoin-inspired systems such as Corda adopt the stateless transaction model where all transactions are interlinked through a concept of transaction inputs and outputs, where each transaction defines its inputs and outputs. Transaction outputs specify conditions that an input must satisfy in order for the transaction to be valid. A transaction input 1) references a previous transaction output, and 2) provides the necessary data as input to satisfy the referenced output. To prevent double spending, UTXO based systems maintain a database of all transaction outputs which have not yet been used as an input (known as unspent transaction outputs). As part of transaction validation, nodes verify that the defined input data meets the necessary constraints specified in the previously unspent output. In practice, these constraints are defined in a limited Domain Specific Language (DSL), for example Bitcoin Script, that provides payments functionality.

To support general smart contracts and non-financial use cases, systems such as Ethereum and Hyperledger Fabric have adopted an Account Balance or "stateful" transaction model. In these systems, transactions do not specify inputs and outputs. Instead, participants deploy a smart contract to the network which codifies all of the business rules that determine the validity of transactions related to the smart contract. Instead of nodes maintaining a database of UTXOs, nodes maintain a database that stores the data managed by a smart contract (e.g., variables that the smart contract program can read and write to). This approach allows the smart contract to contain the logic to process transactions and update its state. The network assigns the deployed smart contract a unique address. Participants subsequently send messages to, and query, this smart contract by constructing transactions that include the message as a payload. The smart contract itself is written in a high level programming language (e.g., Solidity for Ethereum, and Golang for Hyperledger Fabric) that can perform arbitrary calculations (Turing Complete) so long as the program is deterministic. Note that unlike in the stateless model this business logic is not contained within each transaction, which would otherwise have prohibitively expensive storage costs. Furthermore, this approach does not require the business logic to be in the strict form of a domain specific language or logical formula composed of predicates. Programmers can use standard and familiar programming constructs such as for-loops and object oriented programming to define business logic. Oracles proactively provide external data directly via transactions that are sent to the smart contract address, as opposed to the stateless model where oracles reactively sign a transaction or predicate.

Off-chain Code: Code that is executed entirely off the blockchain network. In other words, code that is not "on-chain code".

Query: Clients can send query messages to a node to lookup the information stored on the blockchain. For example, a client can issue a query to retrieve the latest state associated with a smart contract. The node does not necessarily need to communicate with other nodes to answer this query, in some cases it can use its own locally maintained blockchain that is synchronized with the network to retrieve the requested state.

Node: A blockchain is maintained by software that runs on a computer called a node or peer. Each node is connected to other nodes to form the blockchain network and can submit and receive transactions. Each node participating in the Bitcoin network, for example, has its own copy of the blockchain, which is synchronized with other nodes using a peer-to-peer protocol. Organizations and possibly individuals maintain nodes. These nodes run Blockchain software to communicate with each other and form a Blockchain network. In a permissioned blockchain, only authorized and authenticated nodes are able to connect to one another to form the blockchain network. In a permissionless blockchain there is no authentication process and in most cases the identities of the participants are anonymized or not publicly known.

Network: Organizations and possibly individuals maintain computer systems called nodes, these nodes run blockchain software to communicate with each other and form a blockchain network. The network can either be 1) permissioned or 2) permissionless depending on whether nodes and clients go through an authentication and authorization process.

Submit Transaction: Users submit transactions to the blockchain network by using a client that sends them to nodes on the network who subsequently disseminate them to other nodes on the network.

Transaction Validation: Nodes on the blockchain network receive, process and cryptographically validate each transaction. The network ignores invalid transactions.

Blocks: Nodes collect and group valid transactions together into a bundle known as a block. Blocks must follow a predetermined set of rules for a node to determine them to be valid. For example, they must not exceed a maximum size in bytes, contain more than a maximum number of transactions, and must reference the most recent valid block. Nodes use the chain of blocks to establish a total ordering for all transactions. Nodes execute a consensus protocol to construct a new block, and nodes validate and process the transactions within a new block. Nodes ignore invalid blocks.

In distributed systems, multiple processes communicate to enable system operation. It is possible for faults to occur anywhere throughout a distributed system, for example processes may crash or adversaries may send malicious messages to processes. Distributed systems use consensus protocols to achieve reliability in environments with faults. Processes execute a consensus protocol so that they reach agreement within a certain period of time. For example, in Bitcoin, nodes execute a proof-of-work (PoW) consensus protocol to reach agreement on the next valid block and blocks are generated roughly every 10 minutes. PoW is particularly well-suited for permissionless blockchains where the identities and number of participants are not known. An adversary who injects malicious data into the system can trigger faults known as "Byzantine faults" where multiple processes receive conflicting information. Byzantine Fault Tolerance (BFT) refers to consensus protocols that achieve consensus in environments with Byzantine faults. BFT is a well understood distributed systems problem within computer science and implementations have existed for several decades (Lamport, Leslie, Robert Shostak, and Marshall Pease. "The Byzantine generals problem." ACM Transactions on Programming Languages and Systems, 1982). Traditional BFT consensus protocols are well-suited for permissioned blockchains where the identities and number of participants are known.

Validator nodes 1) store the blockchain data structure (blocks and transactions), 2) maintain the integrity of the blockchain by validating transactions and blocks, and 3) maintain the state database by committing the valid transaction updates contained within in a new block. Blocks contain data including a set of transactions, a reference to the previous block, and possibly a "state hash" which is hash over a snapshot of the current state database. In other words, the state hash captures the result of each smart contract executing its relevant transactions. Peers disseminate blocks to one another and use a consensus protocol (e.g., PBFT, or Nakamoto consensus (Bitcoin: A Peer-to-Peer Electronic Cash System, Satoshi Nakamoto 2008)) to reach agreement as to which block to add to the top of the blockchain. Only valid blocks are accepted and added to the blockchain data structure after the network has reached consensus on the most recent block.

Generally, state is the current data, or values of the variables, read from and written to by a smart contract. Smart contracts use variables stored in the state database to validate transactions. In the case of bitcoin, state is the current set of unspent transaction outputs (UTXOs). Validator nodes maintain the blockchain data structure which contains blocks, transactions, and transaction payloads. In the stateful transaction model when a smart contract is deployed it is assigned a unique ID and every validator begins executing the smart contract code locally. When a node receives a new block it takes the transactions and uses the ID to pass them to the relevant running smart contract for execution. The result of this execution is that the smart contract updates its local variables, or state. A state hash is a hash over all of the variables across all of the running smart contracts. Each block includes a state hash which is the result of hashing the entire "world" state after executing all of the transactions within that block. Although the state hash is included directly within the blockchain data structure, the contract state itself is not stored in the blockchain data structure per se—it is a function of smart contracts executing transactions in an agreed-upon order and updating their local state database replicas.

A node's blocks, transactions, and smart contract state are available at any time to a blockchain client. The client sends a query message with a specified contract ID to a node who then relays this request to the running smart contract. The node then relays the response to the client. In the case of a permissioned network, only authenticated and authorized clients can issue query messages. In a permissionless network there is no authentication process.

Order Execute (OE) vs Execute Order Validate (EOV) Architectures

Blockchain architectures generally fall into one of two categories, based on how they process transactions and update their state databases. Most blockchain systems, including Bitcoin and Ethereum, use an order execute (OF) model. In these systems, nodes reach consensus on the latest block of transactions, which includes the reference to the previous block, and establishes a total ordering of the transactions. Once consensus on the next block is achieved, each node executes the transactions within the block and updates the state database.

In contrast, the Hyperledger Fabric 1.0 architecture adopts a Execute-Order-Validate (EOV) architecture. With this approach, nodes first simulate the execution of a transaction, and then construct a transaction endorsement which includes a digital signature by the executing node (the endorser), along with a record of the data that was accessed and written to by the smart contract (read-write set). The transaction endorsement is then submitted to the network to be ordered and placed in a block. Once the nodes reach consensus on the latest block, the corresponding transactions are evaluated according to smart contract-specific endorsement policies, along with consistency checks to ensure the transactions are valid and are not in conflict (e.g., using Multi-Version Concurrency Control MVCC on the transaction read-write sets). For each valid transaction, the node commits the transaction update to the state database and does not re-execute the smart contract.

For a detailed description of the differences between OE versus EOV architectures please see the paper (Androulaki, Elli, et al. "Hyperledger Fabric: a distributed operating system for permissioned blockchains." *Proceedings of the Thirteenth EttroSys Conference*. ACM, 2018) which is incorporated into this application by reference.

Blockchain technology strengthens trust-based contracts by adding rules that are defined and enforced programmatically (Pilkington, Marc, "Blockchain Technology: Principles and Applications," page 15 (citing Kwon, J. (2014). Tendermint: Consensus without Mining. White paper.). Three key technical benefits provided by most blockchain systems are the following:

1) Decentralization: Peer-to-peer blockchain protocols enable counterparties to engage in business processes without requiring trust in each other or a trusted third party. In some applications the function of a trusted intermediary can be replaced by a blockchain network. Disintermediation through decentralization can reduce costs, increase transparency, and improve operating efficiency (e.g., through reduced settlement times).

2) Immutable Transaction Log: Blockchain protocols use modern cryptography to maintain a distributed ledger that records every transaction in a tamper-proof way. Every node within the network stores the entire ledger with timestamps. This facilitates transaction finality, detection of contract execution errors (e.g., double spending), provides resilience when nodes fail, and prevents malicious tampering.

3) Standardized Contract Execution Platform: Blockchain systems offers a shared infrastructure for smart contract execution for an enterprise consortium. Standardization of smart contract templates and their execution platforms can reduce operating costs by easing cross-organizational interoperability for multiple asset classes. In some cases compliance logic can be added to the smart contract which further reduces auditing costs.

Hash Function: A hash function is a one-way function that maps an input of arbitrary size to a fixed size output called a hash. A cryptographic hash function is a hash function that includes the properties (i) easy to generate the hash given the input, (ii) infeasible to generate the original input given the hash, (iii) practically impossible for two similar inputs to have the same output in a so called "collision." SHA256 is an example cryptographic hash function that is used in the Bitcoin and Ethereum Blockchain networks.

A merkle tree is a tree data structure in which every non-leaf node is labelled with the hash of the labels or values (in case of leaves) of its child nodes.

In practice nodes do not directly reach consensus on the contract's state, but instead reach consensus on blocks which include a summary of the state known as the state hash. The state hash itself may be contained within a merkle tree which is a summary of the execution of multiple smart contracts. A state hash is a hash over all of the current values of the variables contained within a smart contract. It represents a "snapshot" of the contract's state at a specific point in time. If two nodes compute the same state hash then they know they are in agreement on the contract's execution.

An important motivation for executing a smart contract on a blockchain is to ensure that all of the counterparties agree on the history and current state of the contract in a non-repudiable way. Nonrepudiation means that the counterparties make a commitment towards their agreement that is permanent and undeniable. In the event that the counterparties disagree on the state of the agreement, they can undeniably identify the same exact moment where their smart contract execution diverged, greatly simplifying resolution or arbitration.

A person of ordinary skill in the art in the field of this system and method is familiar with permissioned blockchain architectures and distributed ledger technology inspired by blockchain technology, such as Hyperledger fabric (www.hyperledger.org), Bigchain DB (www.bigchaindb.com), and R3 Corda (www.r3.com/corda-platform).

Personally Identifiable Information Personal Identifiable Information (PII) and Sensitive Personal Information (SPI) is a type of personal information defined in information security and privacy laws. Examples of PII data include full name, home address, passport number, credit card numbers, and birth place. Specifically, PII can be used on its own, or in combination with other (typically public) data to identify an individual, known as a data subject. In many cases, personal data is subject to storage and processing requirements to ensure user privacy (e.g., PCI DSS, HIPPA compliance). Through regulation such as the General Data Protection Regulations (GDPR) now active in the European Union (EU), most modern information systems and their respective organizations must provide methods for identifying and in some cases destroying personal information, so that it is no longer accessible to the organization. Some privacy laws incorporate a concept of the "right to be forgotten" which grants data subjects with the legal right to have certain PII data that is stored or processed by an organization to be deleted within a certain time frame.

Hash function Preimage Attacks: If the domain of inputs to a hash function is small enough. then even a cryptographic hash may be vulnerable to a preimage attack. In a preimage attack, the attacker determines the original document (known as the preimage) given just the hash. Due to the randomness of the hash, typically this requires the attacker to use a brute force method (e.g., password cracking) whereby they systematically try every possible input (reimage) to the hash function and check if it matches the hash they are attacking. In some cases the attacker attempts to break multiple hashes at the same time, in which case after generating a hash they compare it against all of those in the list of hashes that they are breaking. Attackers may use already existing dictionaries known as "rainbow tables" that map common words to a typical hash function output (e.g., MD5), which allows them to quickly lookup the pre-image without having to compute the hash function. To combat brute force attacks, systems often employ a "salt" which is a random string of characters that is associated with each hashed data. The salt is included in the hash, which both i) prevents the hacker from using rainbow tables, and ii) prevents the attacker from breaking multiple hashes at the same time.

Off-chain Storage, On-chain Cryptographic Hashes: For privacy and scalability purposes, some blockchain systems store private data "off-chain" on a separate mutable system that is accessible to the relevant participants. In these systems, cryptographic hashes of the off-chain data are stored on the blockchain to provide evidence that the data existed at a specific point in time. Specifically, the hash is included in the payload of a transaction. The transaction also includes metadata such as a trusted timestamp and possibly digital signatures for non-repudiation purposes. In this design the blockchain network performs decentralized notarization services of data (described in more detail in WO2017136643A1—"System and method for secure management of digital contracts", Hossein Kakavand and Sam Wood that is incorporated herein by reference). At any time if there is a dispute as to the authenticity of a contract, a counterparty can provide an arbiter with the original document along with the transaction ID that references the blockchain transaction. The arbiter then computes the cryptographic hash (e.g., SRA-256) of the document and compares this to the hash that is stored within the referenced transaction. If the hashes match, and if the arbiter trusts the integrity of the blockchain network (e.g., they run a node), then the arbiter can be confident that the document did exist at a point in time specified in the transaction.

Since the data itself is not stored on the blockchain, the participants can readily destroy the data using traditional methods. For example, if the data is stored in a common relational database then a counterparty can issue a delete transaction which will remove the data from the database. Importantly, this deletion does not violate the integrity of the blockchain, since no data is deleted from the immutable ledger. However, this off-chain storage approach has several disadvantages, namely:

1) it introduces system complexity;
    Specifically, it requires separate systems to store the off-chain data. These systems require their own access control and integrity capabilities to protect the data and ensure it is available to the necessary counter-parties for at least as long as the blockchain network is active.)
2) it reduces the availability of data needed for arbitration;
    By placing the data off-chain on a mutable database, both the mutable database and the blockchain must be available to the third party in order for them to perform arbitration. A failure in either of these systems would prevent the arbitration process.
3) it limits the visibility and reliability benefits of on-chain processing by smart contracts.
    Typically "on-chain" smart contracts can only process data that is stored on the blockchain, which greatly limits blockchain applications to only those that process data which will not be deleted. Additionally, many organizations apply blockchain technologies to their business processes in order to achieve shared visibility into the execution of a business process among semi-trusted and untrusted participants. By placing data off-chain, these applications must also process the data off-chain using traditional systems, which do not provide the visibility and reliability benefits of smart contracts executed by blockchain technology.

Importantly, when computing the hash to store on-chain care must be taken to ensure that the hash is not susceptible to preimage attacks. Depending on the application, this may require storing another secret that is only shared between the counterparties that functions as a salt. In other applications a shared secret may not be possible.

Transient Transaction Data: The constraint that smart contracts must only operate on "on-chain" data limits the type of applications that can be built. For example, such a smart contract cannot encrypt and decrypt data with a secret key since the the key would necessarily be stored on the blockchain and available to the other participants. To address these limitations, blockchain architectures that adopt an EOV consensus model (i.e., Hyperledger Fabric 1.0, 1.1, 1.2), introduce a concept of "transient" data fields. A transient data field is data that is included within the transaction and is available to a smart contract during transaction execution, however it is not stored on the blockchain. Among other uses, an application can use transient data to store a secret that is used by a smart contract to encrypt and decrypt data that is stored "on-chain", without the secret key being available to all of the network participants.

Side Database: To address some of the limitations identified for an off-chain storage approach, recently blockchain systems (i.e., Hyperledger Fabric 1.2) have included a "side database", or "private collections", feature which is a similar to transient transaction data. As with transient data, the side database provides data to smart contracts without the data being placed "on-chain". Unlike transient data, the network operators can configure the blockchain with data sharing policies on the side database, so that the data is shared only with authorized peers. When a smart contract writes data to the side database, the hash of the data is included on the blockchain within a transaction. The side database is synchronized among the nodes in such a way that smart contracts will only read a version of the data that corresponds with the transaction's current state context. Similarly, if a smart contract writes to the side database then this write will only committed at the time that the whole transaction is committed. From the perspective of a smart contract, the side database functions identically as the normal state database, except that the values read from and written to are not stored on the blockchain.

Freezing Digital Assets By Burning Private Keys: Traditional databases allow clients to perform Create, Read, Update, and Delete (CRUD) operations on data. Some blockchain systems such as BigchainDB provide an analogous set of operations, Create, Retrieve, Append, and Burn (CRAB) on assets managed by the blockchain. Append is analogous to Update, in that the operation updates the current state of an asset, such as changing its owner. In a traditional database an Update operation mutates the record, meaning that the previous version of the record would be deleted and the new version inserted. However, since blockchains are immutable and append only the Append operation only inserts a new version of the record, without deleting the earlier version. Where a traditional database would Read a single version of the record, the analogous blockchain operation Retrieve will only return the most recent version. Lastly, where a traditional database can simply Delete a record, BigchainDB provides a Burn operation which freezes an asset by transferring ownership of it to a public key (or public key hash) with no corresponding private key. Since the new owner of the asset does not exist, the asset can no longer be transferred or processed by participants. Although the Burn operation is similar to Delete in that the burned data can no longer be processed, the various versions of the asset are still stored within the blockchain data structures on the nodes. Burn is not an effective mechanism to destroy data that is stored on the blockchain since the asset data remains on the blockchain nodes. Checkpoint and Prune: Some blockchain systems including Hyperledger Fabric provide a checkpointing mechanism to speed-up the time it takes to synchronize a new peer who has not yet downloaded and validated the entire blockchain. In some cases checkpointing can also be used to prune invalid transactions and reduce the amount of space required to store the blockchain. A peer constructs a checkpoint message specific to a certain block height by inspecting their local blockchain. Specifically, the checkpoint message includes a block number, the corresponding block hash for that block, the corresponding state hash for the block, along with a digital signature of the peer. When a new peer joins the network they specify a policy that determines what peers they trust to receive checkpoints from. During the synchronization process, the peer can use the checkpoint to avoid having to validate every transaction up to the checkpoint. Since EOV architectures may include invalid transactions, the payloads of failed transactions may also be excluded, or "pruned", from the synchronized blockchain by only including their transaction IDs in the block. Importantly. this pruning process preserves the integrity of the blockchain. but prevents the pruned transactions from being verified at a later point in time. A straightforward extension of the checkpoint approach is to prune transaction payloads for transactions that are older than a certain age and do not have write-set for data that is in the current state database (so-called "spent" transactions). With this approach, new peers that are synchronizing with older peers only need to retrieve the current state of the latest previous checkpoint. Specifically, they do not need to "replay" (re-execute and validate transactions) the blockchain since the beginning of time (i.e., the first "genesis" block). they would only do this process since the most recent checkpoint.

One can use a checkpoint and prune approach to delete data that is stored on the blockchain before a specific checkpoint. This approach can effectively delete all data that is older than a certain age, or delete "spent" transaction data modeled as urxo, however it does not provide a general way for deleting specific records. Specifically, the checkpoint and prune approach does not readily allow the network to remove only both recent and historical PII data specific to an individual (e.g., in response to a "right of be forgotten" request). Furthermore, visibility of all historical transactions is limited or lost.

Crypto-shredding refers to a process for erasing encrypted data by deliberately deleting the encryption key. Because the keys are no longer available, the encrypted data becomes indistinguishable from random data. When used with careful destruction of the key and industry standard encryption algorithms (e.g., AES-256), crypto-shredding is a secure and efficient method for destroying data. For example, current Apple iOS devices use crypto-shredding when activating the "Erase all content and settings" option on the device, which makes all data on the device cryptographically inaccessible. Often times the encryption key is stored on a hardware security module, which carefully restricts access to the key to only authorized applications. Traditional data destruction or erasure methods such as overwriting and degaussing can be employed to gain more confidence that the encryption key is actually destroyed. Since the key is much smaller than the data being deleted, crypto-shredding can destroy data faster than traditional methods. An advantage to crypto-shredding is that so long as the key is adequately protected all replicas of the encrypted data are automatically destroyed when only the key is destroyed. This advantage is especially important to comply with policies that require all copies of the data (e.g., tape backups, log files) also be destroyed. Due to the size and complexity of some organizations and software. even locating all of the replicas of data can be expensive and slow, while the larger task of destroying each copy remains impractical.

In view of the above, what is needed is a new blockchain system that allows specific data to be destroyed, while otherwise maintaining the integrity and availability benefits of existing blockchain systems. This system must support efficient data destruction without disruption or interruption of the operation of the system. In particular, the system must allow network operators to destroy data belonging to individuals in order to comply with company policies, for example to satisfy a request by an individual for their data to be deleted.

BRIEF DESCRIPTION OF THE DRAWINGS

For a more complete understanding of the invention, reference is made to the following description and accompanying drawings, in which:

FIG. 9. illustrates an example first message generated by the Distributed Ledger Oracle Server to be processed by a Smart Contract that contains sensitive data in plaintext that must be deleted later;

FIG. 10. illustrates an example message transformation setting that is used to transform an example first message into an example encoded first message.

FIG. 11. illustrates an example encoded first message that does not contain sensitive data in plaintext; and FIG. 12. illustrates example pseudocode to illustrate the encrypt and decrypt processes that are executed as part of the message encode and message decode processes.

DETAILED DESCRIPTION OF ONE OR MORE EMBODIMENTS

The disclosed system and method allow data that has been placed on a distributed ledger to subsequently be rendered inaccessible to the network, and effectively destroyed. The system and method allows data to be destroyed from a distributed ledger without violating the integrity and availability of the ledger. Specifically, the destruction process must not interfere with the existing ledger functions and operations. For example, the destruction process must not introduce processing delays, cause network downtime, require network reconfiguration, render unrelated data inaccessible temporarily or permanently, or otherwise prevent the execution of smart contracts.

The disclosed system and method also enables the efficient destruction of data relating to a first individual from an immutable distributed ledger. Specifically, the destruction process must be automated and conducted quickly, for example in response to a time-sensitive "right to be forgotten" request issued by an individual. In this case, the destruction process must destroy all of the identified data that is relevant to the data subject. This data includes all copies, backups, logs, or replicas across all system components and storage systems including file systems, databases, and queues.

The disclosed system and method also allows a user to restore their data back to the distributed ledger system after their data has previously been destroyed. Specifically, before destroying the data subject's data, the system may provide the data subject with a secret only known to the data subject, which the data subject can later use to restore their previously destroyed data.

The disclosed system and method accordingly comprises the several steps and the relation of one or more of such steps with respect to each of the others, and the apparatus embodying features of construction, combinations of elements and arrangement of parts that are adapted to affect such steps, all is exemplified in the following detailed disclosure.

Figure 1:
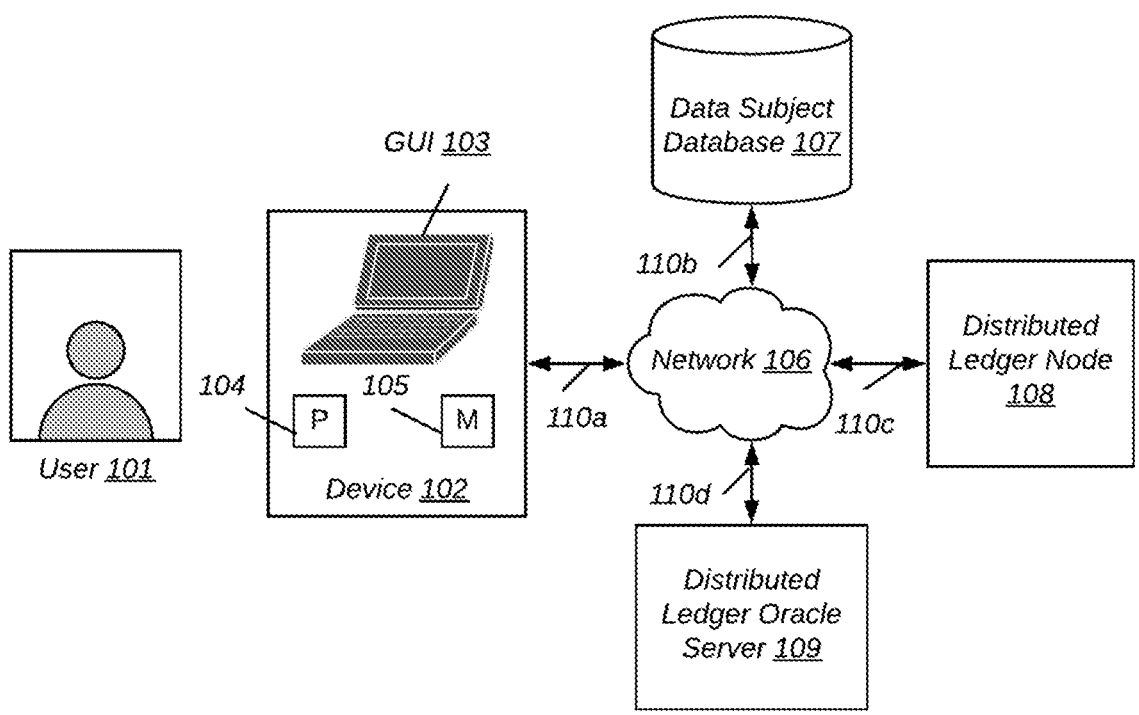
FIG. 1. illustrates an example immutable distributed ledger environment that supports destruction of sensitive data.

FIG. 1. illustrates an example immutable distributed ledger environment 100 that enables data destruction functions. The environment 100 conducts distributed ledger functions including the execution of smart contracts in the distributed ledger node 108 using a smart contract engine 311 that read from and write to a state database 316 shown in FIG. 3. The environment supports a process that destroys data from the distributed ledger. A user 101 interacts with a GUI 103 using a device 102 that includes at least a processor 104 and memory 105. For example, an employee at a insurance company uses a browser on his laptop to access a web portal that displays insurance claims. The device 102 connects to a network 106 over an interface 110*a* to access and manage a distributed ledger oracle server, or server, 109 that is connected to the network 106 using an interface 110*d*. The server 109 communicates with a data subject database (DSDB) 107 that is connected to the network 106 over an interface 110*b*, and communicates with a distributed ledger node 108 that is connected to the network 106 over an interface 110*c*. Within an environment 100 there are possibly multiple users 101, devices 102, servers 109, and distributed ledger nodes 108, connected over a single network 106.

In some embodiments, users 101 belong to one or more organizations, for example insurance companies, and operate and manage the components in the environment 100 on behalf of their respective organization.

In a preferred embodiment, a plurality of environments 100 connect to a single network 106. For example, a first insurance company manages a first environment, a second insurance company manages a second environment, and the first environment and second environment are interconnected via a common network 106. In a preferred embodiment, a plurality of environments 100 connect over a single network 106, that share a single common data subject database 107. In a preferred embodiment, the data subject database 107 is maintained by distributed ledger nodes 108, and is stored within a side database 317.

In some embodiments, a device 102, data subject database 107, and distributed ledger oracle server 109, are physically located on the premises of an organization; and the distributed ledger node 108 is physically located on the premises of a Cloud infrastructure provider. In some embodiments, a device 102, data subject database 107, distributed ledger oracle server 109, and distributed ledger node 108, are physically located on the premises of an organization. n some embodiments, a device 102, data subject database 107, distributed ledger oracle server 109, and distributed ledger node 108, are physically located on the premises of a Cloud infrastructure provider. In some embodiments, distributed ledger oracle server 109 functions are executed on a device 102.

A distributed ledger node, or node, 108 communicates with possibly multiple other distributed ledger nodes via an interface 110c and network 106. A node 108 provides an execution environment for smart contracts 311, and communicates with other nodes 108 to establish a blockchain network that coordinates the execution of smart contracts.

Figure 5:
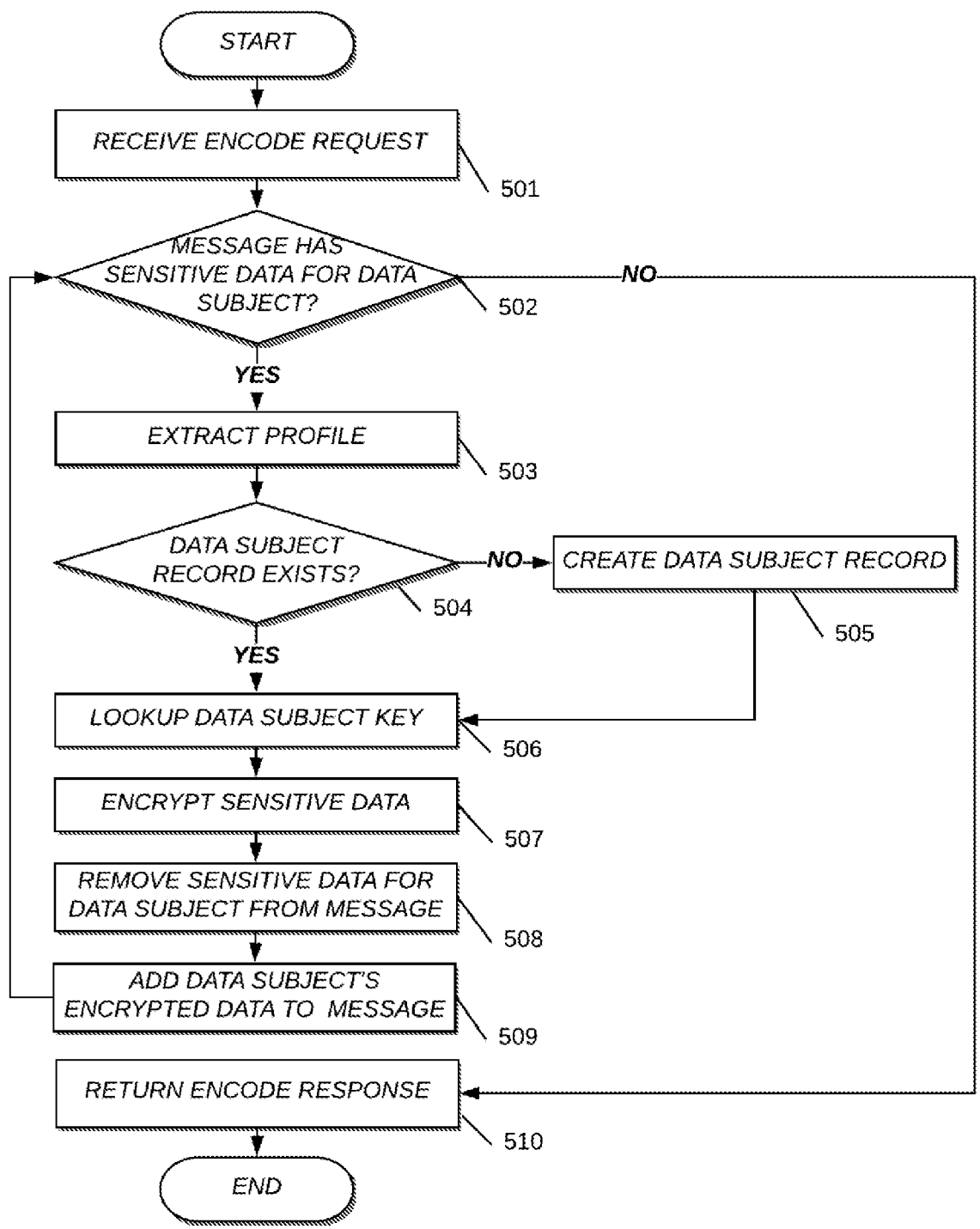
FIG. 5. illustrates an example workflow that prepares an encoded message for subsequent processing by a Smart Contract. The encoded message is prepared from an original message that may contain sensitive data to be processed by a Smart Contract.
Figure 6:
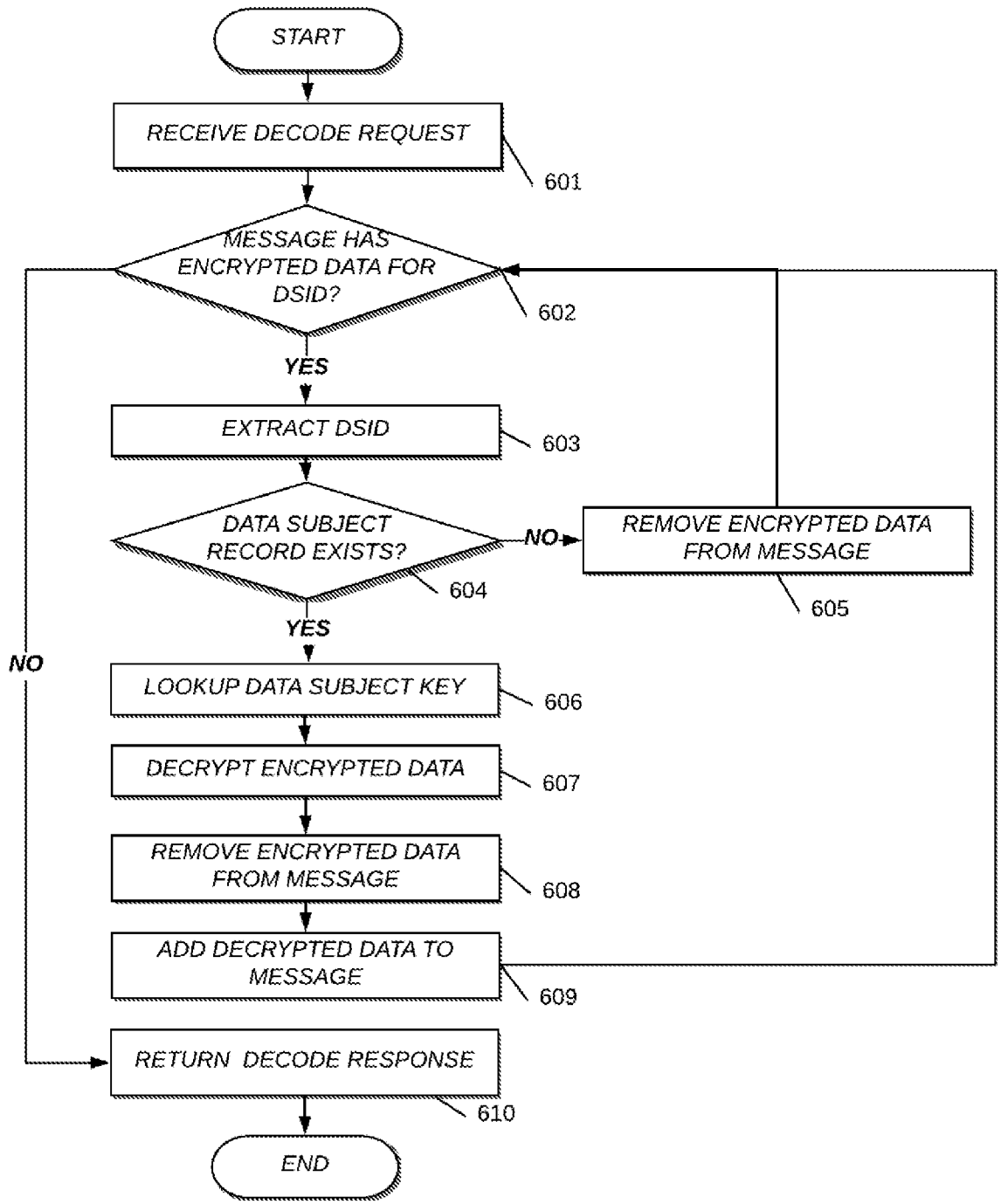
FIG. 6. illustrates an example workflow that prepares a decoded message from a previously encoded message that may contain sensitive data.
Figure 8:
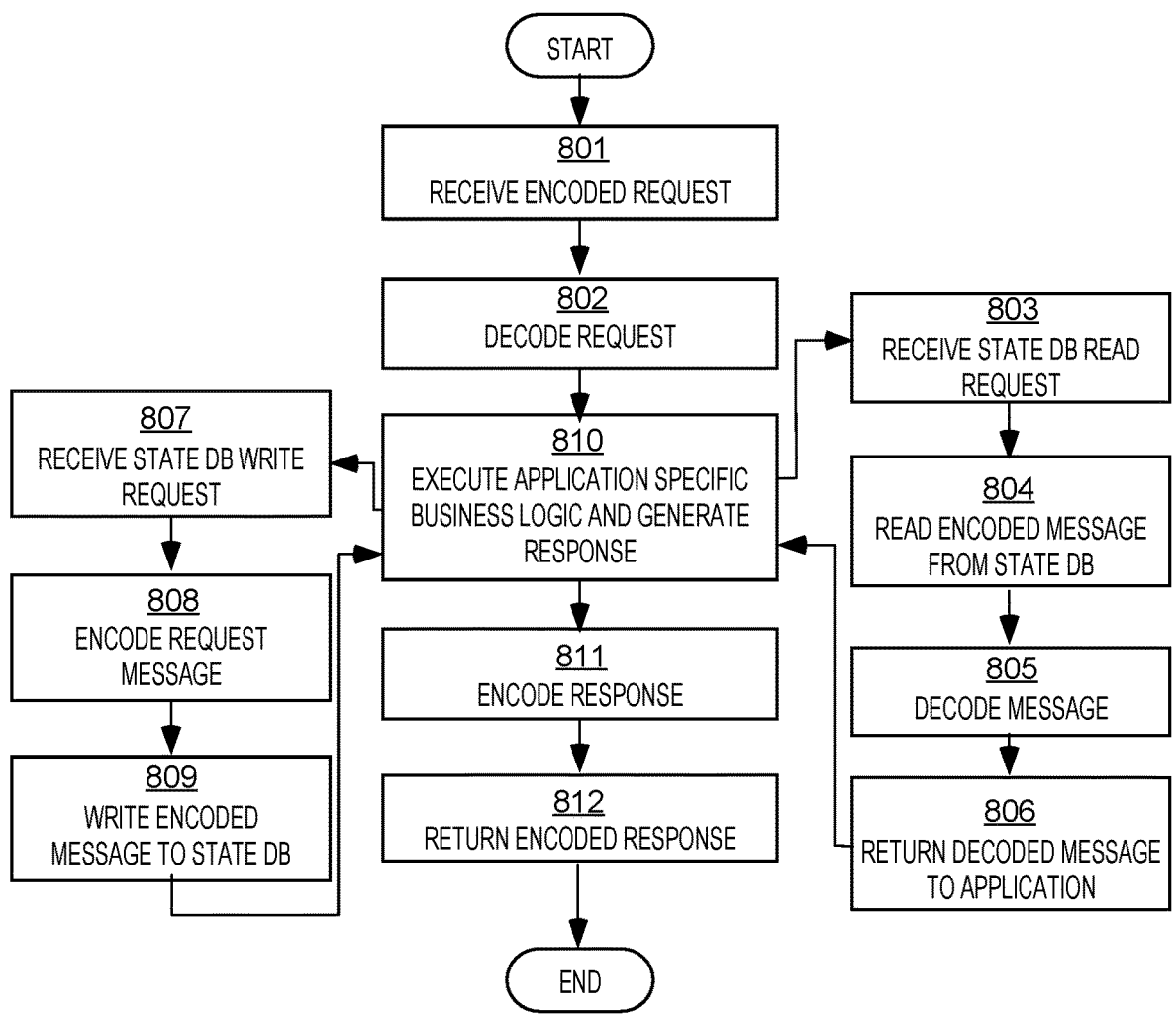
FIG. 8. illustrates an example workflow executed by a Smart Contract, where the workflow receives an encoded request, decodes the request, executes application specific business logic that may read and write sensitive data to a state database, and returns an encoded response to a Distributed Ledger Oracle Server.

In a preferred embodiment, nodes 108 coordinate the execution of smart contracts that run, among other workflows, steps from the workflows illustrated in FIG. 5., FIG. 6., and FIG. 8. Additionally, nodes 108 coordinate the execution of smart contracts that execute application specific business logic 810, for example to process insurance claims.

Figure 4:
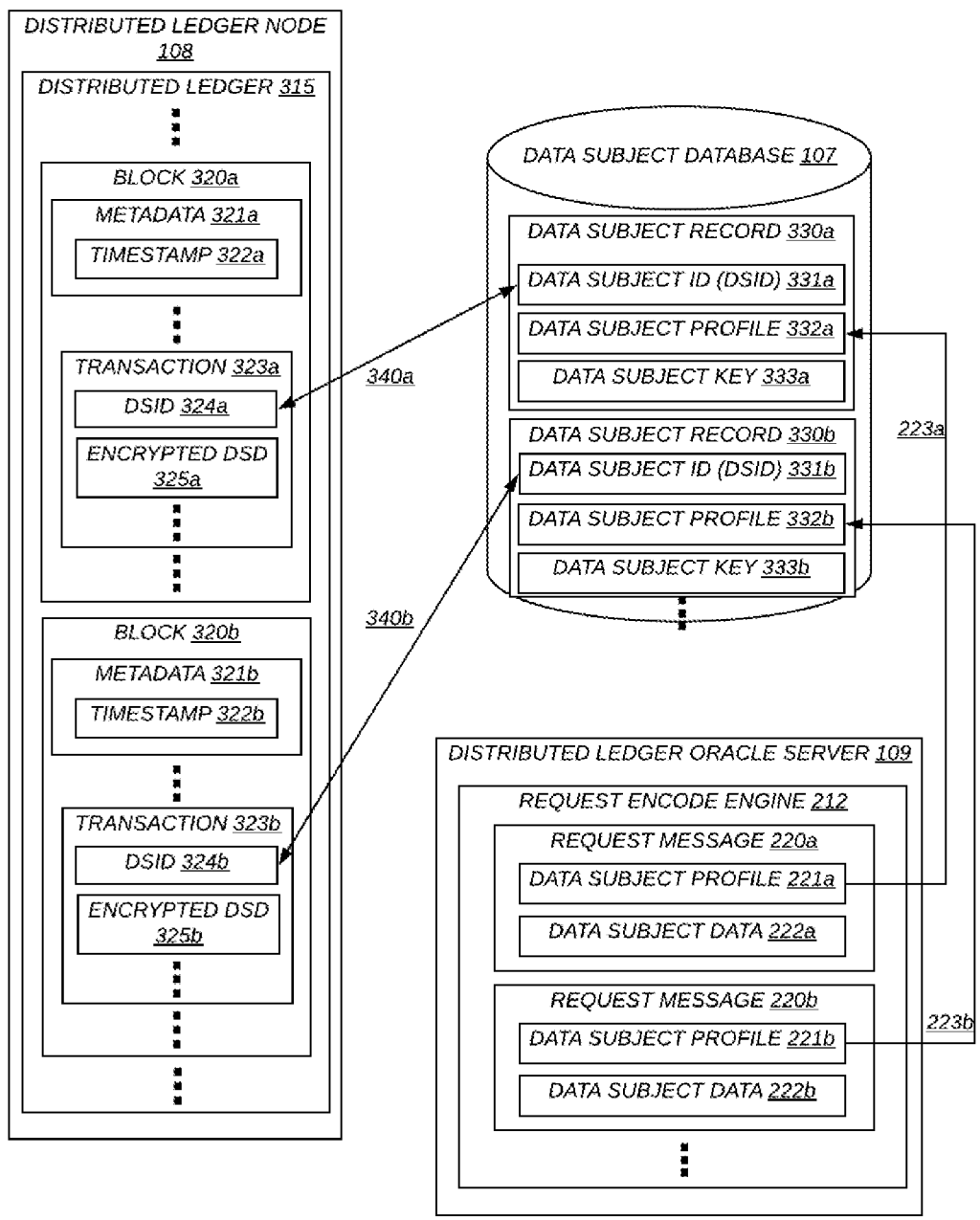
FIG. 4. illustrates an example Data Subject Database, Distributed Ledger Node, and Distributed Ledger Oracle Server storage arrangement.

As shown in FIG. 4, the data subject database (DSDB) 107 stores data subject records (DSR) 330a, 330b specific users 101. These records are populated and managed by the distributed ledger oracle server 109. A DSR 330a, 330b consists of at least a data subject ID (DSID) 331a, 331b, data subject profile (DSP) 332a, 332b, and a data subject key (DSK) 333a, 333b. The DSID 331a, 331b is a unique identifier within the environment 100 that corresponds to a data subject. For a given DSID 331a, 331b, the server 109 or node 108 queries the DSDB 107 to lookup the corresponding DSR 330a, 330b that contains that DSID 331a, 331b. The DSP 332a, 332b contains identifying information about the data subject that is also used by the server 109 or node 108 to lookup a data subject's respective DSR 330a, 330b, for example when the DSID 331a, 331b is not available. The DSK 333a, 333b is a secret key that is used to encrypt 507 and decrypt 607 data that belongs to a data subject, where this data is eligible for subsequent destruction. In some embodiments, the DSP 332a, 332b includes the DSID 331a, 331b. In a preferred embodiment, the DSID 331a, 331b is a Universally Unique Identifier (UUID). In some embodiments, the DSID 331a, 331b is constructed using a cryptographic hash algorithm. In a preferred embodiment, the DSP 332a, 332b includes a user's email address. In some embodiments, the DSP 332a, 332b includes a user ID that corresponds to user identity information maintained by an external system, for example by a separate Identity Provider (IdP). In a preferred embodiment, the DSK 333a, 333b includes a random 32 byte sequence that is a private key that is used to perform AES-256 encryption.

In a preferred embodiment, the DSDB 107 is located within, or directly managed by, a distributed ledger node 108. For example, within a side database 317 that nodes 108 keeps synchronized with the distributed ledger 315 using transactions 323a, 323b.

In a preferred embodiment, the DSK 333a, 333b is generated by a server 109 and is passed to a smart contract as a transient field in a transaction. In this case, the smart contract stores the DSK 333a, 333b within a DSR 330a, 3330b that is stored in the DSDB 107, and the DSBD 107 is contained within, and maintained by, the side database 317. In some embodiments, the DSK 333a, 333b is generated by the node 108 within a smart contract. In this case, the smart contract is non-deterministic and the key is generated at random by the Smart Contract Execution Engine 311. In this case, the blockchain network must support the execution of non-deterministic smart contracts, for example by setting the endorsement policy of the non-deterministic smart contract to allow the endorsement by a single organization.

In some embodiments, the data subject database 107 is implemented as a Relational Database Management System (RDMS), and data subject records 330a, 330b are records stored in that RDMS. In some embodiments there are multiple DSRs 330a, 330b that correspond to a single data subject and DSP 332a, 332b.

Figure 2:
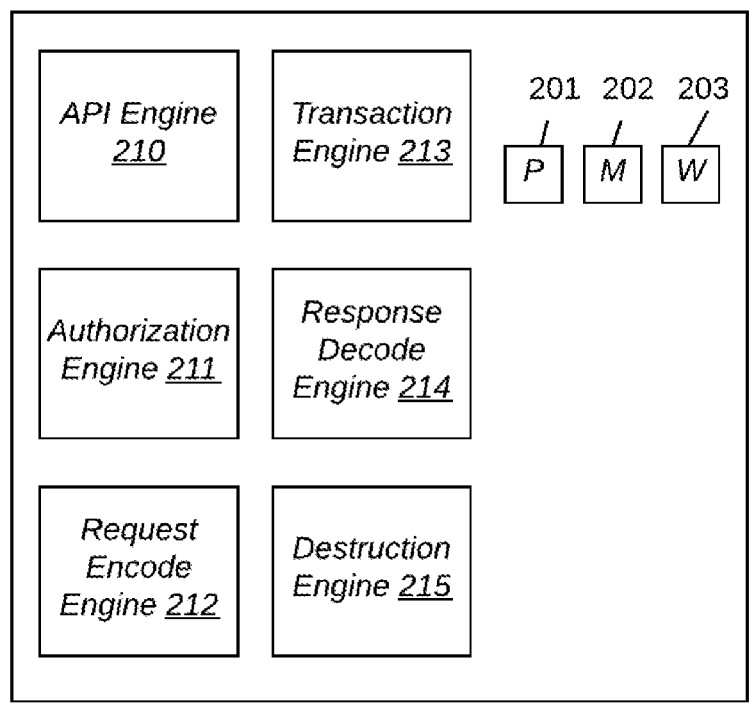
FIG. 2. illustrates an example distributed ledger oracle server and its components.

FIG. 2. Illustrates an example distributed ledger oracle server, or server 109, and its components. The server 109 consists of at least a processor 201, memory 202, and private keys stored in a wallet 203. The server 109 communicates with one or more distributed ledger nodes 108, a data subject database 107, and devices 102, to process and submit data corresponding to a user 101 to a distributed ledger node 109 for processing by one or more smart contracts. In some embodiments, the distributed ledger oracle server 109 consists of a number of services that intercommunicate over a network. In some embodiments, the distributed ledger oracle server 109 is managed and deployed using container orchestration software such as Kubernetes.

The API (Application Programming Interface) Engine 210 receives (process 701 shown in FIG. 7) formatted request messages, for example a first message, originally issued by one or more devices 102. The first message consists of one or more fields which have corresponding values, for example illustrated in FIG. 9. The API engine 210 verifies that the received messages conform to a predetermined message format, and returns an error to the device 102 that issued the first message if this message validation fails. The message may contain fields with sensitive data as values, where the values pertain to a data subject, and are stored on a distributed ledger, and are deleted at a later time. The reception of a message by the API Engine 210 triggers the server 109 to initiate the steps illustrated in FIG. 7. The API Engine 210 sends valid messages to the Authorization Engine 211 for subsequent processing. The API Engine 210 receives a response corresponding to the first message request from the Response Decode Engine 214, and sends this response back 707 to the original device 102 which issued the first message. In a preferred embodiment, the first message either requests data from, or sends data to, a smart contract 311 that receives and processes the first message. In some embodiments, the API Engine 210 is implemented using an HTTP server that exposes a REST/JSON interface, Google Remote Procedure Call (gRPC) interface, and a SOAP/XML interface.

In a preferred embodiment, the server 109 uses the message format to determine a message type. The message type is used to lookup a configuration that determines which data fields within the message are sensitive and determines which data fields within the message pertain to what data subjects. In some embodiments, the message includes metadata that denotes which data fields are sensitive and which data fields pertain to what data subjects.

The Authorization Engine 211 receives request messages from the API Engine 210 and determines whether or not the issuer of the request is authenticated and authorized to make the request 702. As part of this authorization and authentication determination the Authorization Engine 211 examines both data about the authenticated issuer of the request and the type of request. If the request is a data destruction request, then the Authorization Engine 211 passes the message to the Destruction Engine 217 for subsequent processing. Otherwise, the Authorization Engine 211 passes the message to the Request Encode Engine 212 for subsequent processing. If the request message is not authorized, then the Authorization Engine 211 returns an authorization error to the API Engine 210, which forwards the error to the original issuer device 102.

In a preferred embodiment, the issuer is a user 101 who has authenticated with the server 109 using multi-factor authentication (MFA). In some embodiments, the issuer is a process running on a device 102.

In some embodiments, the Authorization Engine 211 inspects a role that is defined within in a JSON Web Token (JWT) that is included in the request and generated by the device 102 on behalf of the user 101, to determine whether the user 101 has the necessary permissions to issue the request. In some embodiments, the Authorization Engine 211 communicates with one or more distributed ledger nodes 108 via a authorization service to make an authorization and authentication determination. In some embodiments, the Authorization Engine 211 communicates with one or more distributed ledger nodes via a smart contract 108 to make an authorization and authentication determination. In some embodiments, the Authorization Engine 211 makes a preliminary authorization and authentication determination, and a smart contract 311 running on one or more distributed ledger nodes 108 executes subsequent validation checks to determine whether the request is authorized.

The Request Encode Engine 212 receives a first request message 220a, 220b shown in FIG. 4 and converts it into an encoded form 703 that is later included within a blockchain transaction payload. The Request Encode Engine 212 constructs an encoded message using an encoding process illustrated in FIG. 5. and the engine passes the encoded message to the Transaction Engine 216 for subsequent placement and processing by the blockchain network 704. Specifically, the Request Encode Engine 212 triggers an encoding process illustrated in FIG. 5 to transform the first message into an encoded message 702. The Request Encode Engine 212 subsequently passes the encoded request message to the Transaction Engine 213 which submits the encoded request message to the blockchain network 704. A smart contract 311 receives the encoded request message and executes the steps of the process illustrated in FIG. 8. As a result of the execution of the process illustrated in FIG. 8, the Transaction Engine 213 receives 705 an encoded response, and passes the encoded response to the Response Decode Engine 214.

In a preferred embodiment, the encoding process illustrated in FIG. 5. is executed by a smart contract 311. Specifically, the Request Encode Engine 212 passes the first request message 220a, 220b to the Transaction Engine 213. The Transaction Engine 213 places the first request message 220a, 220b within the transient data field of a transaction, and submits the transaction to the blockchain network. The Transaction Engine 213 generates secret keys (e.g., using a secure random number generator) DSKs 333a, 333b and places them as transient data within the transaction. A smart contract 311 running on the blockchain network receives the transaction, executes the steps illustrated in FIG. 5., and returns the encoded response to Transaction Engine 213. If step 505 is executed, then for each time this step is executed the smart contract will use a unique secret key contained within the transient data field of the transaction to generate a unique DSK 333a, 333b.

In some embodiments, the DSDB 107 is not managed by or stored within a side database 317. In this case, the encoding process illustrated in FIG. 5 is executed by the Request Encode Engine 212 on the Distributed Ledger Oracle Server 109. The Request Encode Engine 212 does not interact with the Transaction Engine 213 to issue a transaction. Specifically, the Request Encode Engine 212 connects directly to an off-chain DSDB 107 to lookup and create the DSRs 330a, 330b in step 505. In addition to all of the steps illustrated in FIG. 5. The Request Encode Engine 212 performs the encryption operation 507 to generate the encoded response.

The Transaction Engine 216 constructs distributed ledger transactions 323a, 323b, submits them to one or more distributed ledger nodes 108 for processing, and receives transaction responses which include the results of the network executing each transaction. The Transaction Engine 216 includes an encoded message within the transaction payload, as well metadata that may include transient data and a smart contract identifier. The Transaction Engine 216 submits a transaction to one or more distributed ledger nodes 108 that run smart contracts 311 that receive messages contained within transaction payloads, execute workflows to process the encoded message on the ledger 308 and update the State Database 316 and the Side Database 317, and generate transaction execution responses. Transactions are validated and confirmed by the network of distributed ledger nodes 108 and is placed into blocks 320a, 320b that are stored on the distributed ledger 315. Each block 320a contains metadata 321a, 321b associated with their transactions, along with a timestamp 322a which denotes when the block 320a was created. The Transaction Engine 216 uses keys stored in a wallet 203 to generate digital signatures that are included within transactions, and to encrypt network 106 communication.

In a preferred embodiment, the Transaction Engine 216 uses a permissioned blockchain, for example Hyperledger Fabric, to construct transactions 323a, 323b and submit them to a distributed ledger node 108 running the peer software. In a preferred embodiment, the Transaction Engine 216 interacts with a blockchain that uses an EOV architecture. In this case, the Transaction Engine 216 first submits the transaction to one or more nodes 108 to collect endorsements. The Transaction Engine 216 receives endorsement responses from one or more nodes 108, inspects the responses to determine if the transaction has sufficient endorsements depending on the smart contract 311 endorsement policy, and then submits the endorsed transactions to the blockchain network for ordering and placement within a block 312. In some embodiments, the Transaction Engine 216 includes DSKs 333a, 333b within the transient data field of the transaction. Specifically, the Transaction Engine 216 includes DSKs 333a, 333b that correspond to DSIDs 324a, 324b referenced in the encoded request within the transaction payload. In a preferred embodiment, the Transaction Engine 216 includes initialization vector (IV) data generated securely at random on the server 109 within the transient data field of the transaction. This IV data is used by the encode process illustrated in FIG. 5. to encrypt sensitive data 507.

In one embodiment, the Transaction Engine 216 includes a request message within the transient data field of a transaction. In this case, a smart contract 311 processes the transaction by executing the steps illustrated in FIG. 5., and the smart contract 311 accesses the DSDB 107 and corresponding DSKs 333a, 333b directly through a side database 317. In the case of executing step 505, the smart contract 311 references DSKs 333*a*, 333*b* included within the transaction's transient data fields. The Transaction Engine 216 receives the resulting encoded request from the node 108.

In a preferred embodiment, the DSDB 107 is stored within a side database 317 and the Transaction Engine 216 includes an encoded response message within the payload of a transaction. In this case, a smart contract 311 processes the encoded response message by executing the steps illustrated in FIG. 6 where the smart contract 311 processes the encoded response as a decode request, and the Smart Contract accesses the DSDB 107 and corresponding DSKs 333*a*, 333*b* directly through a side database. The Transaction Engine 216 receives the resulting decode response from the node 108. The Transaction Engine 216 does not submit the transaction for ordering, commitment, or placement into a block, to avoid storing the sensitive details on the distributed ledger 315.

In a preferred embodiment, the Transaction Engine 216 includes an encoded request message within the payload of a transaction. In this case, a smart contract 311 processes the encoded message by executing the steps illustrated in FIG. 8., and the smart contract 311 accesses the DSDB 107 and corresponding DSKs 333*a*, 333*b* directly through a side database 317. The Transaction Engine 216 receives the resulting encoded response 812 from the node 108. In a preferred embodiment, the Transaction Engine 216 includes a data destruction request message within the transient data field of a transaction. In this case, a smart contract 311 processes the data destruction request and accesses the DSDB 107 to delete the corresponding DSRs 330*a*, 330*b* referenced in the request by a DSID 331*a*, 331*b* or a DSP 332*a*, 332*b*.

The Response Decode Engine 214 receives encoded response messages and decodes the message 706 to construct a decoded response. The Response Decode Engine 214 triggers the decode process illustrated in FIG. 6. to construct the decoded response 610. The Response Decode Engine 214 sends the decoded response 610 back to the API Engine 210 for subsequent processing.

In a preferred embodiment, the DSDB 107 is stored within a side database 317 and the decode process illustrated in FIG. 6 is executed by a smart contract 311. The Response Decode Engine 214 passes the encoded response message to the Transaction Engine 213 which includes the encoded response message within a transaction payload, and the Transaction Engine 213 submits the transaction to the blockchain network. The Transaction Engine 216 does not submit the transaction for ordering, commitment, or placement into a block, to avoid storing the sensitive details on the distributed ledger 315. In some embodiments, the DSDB 107 is not managed by or stored within a side database 317. In this case, the decode process illustrated in FIG. 6 is executed by the Response Decode Engine 214 on the server 109. In this case, the Response Decode Engine 214 does not interact with the Transaction Engine 213 to issue a transaction. Specifically, the Response Decode Engine 214 connects directly to the DSDB 107 to lookup 604 the DSK 333*a*, 333*b* in step 606. In addition to all of the steps illustrated in FIG. 6., the Response Decode Engine 214 uses the DSK 333*a*, 333*b* to perform the decryption operation 607.

The Destruction Engine 217 triggers a destruction process to destroy data stored on the blockchain corresponding to a data subject, by making the data inaccessible through the deletion of DSRs 330*a*, 330*b* and their respective DSKs 333*a*, 333*b* stored in the DSDB 107. The Destruction Engine 217 receives delete requests that specify which data subject whose data must be destroyed. These requests reference the data subject either by specifying the data subject's corresponding DSID 331*a*, 331*b*, or by specifying a DSP 332*a*, 332*b*. In the case that the destruction request specifies a DSID 331*a*, 331*b*, then the destruction process looks up the corresponding DSR 330*a*, 330*b* that contains the specified DSID 331*a*, 331*b*. In the case that the destruction request specifies a DSP 332*a*, 332*b*, then the destruction process looks up the corresponding DSR 330*a*, 330*b* that has a profile 332*a*, 332*b* that matches the one specified in the request. The destruction process issues a delete operation to the DSDB 107 which subsequently deletes the DSR 330*a*, 330*b* and corresponding DSK 333*a*, 333*b*, belonging to the data subject.

In a preferred embodiment, the DSDB 107 is stored within a side database 317 and the destruction process is executed by a destruction smart contract 311. The Destruction Engine 217 passes the destruction request to the Transaction Engine 213 which includes the request as a transient data field of a transaction. Specifically, the transient data field includes the DSID 331*a*, 331*b*, or DSP 332*a*, 332*b*. The Transaction Engine 213 submits the transaction to the blockchain network. A destruction smart contract 311 processes this transaction and deletes the corresponding DSR 330*a*, 330*b* from the DSDB 107, using the DSID 331*a*, 331*b* or DSP 332*a*, 332*b* in the transient data field to reference the DSR 330*a*, 330*b*. In some embodiments, there are multiple DSRs 330*a*, 330*b* that correspond to a data subject, and the Destruction Engine 217 deletes all of the data subject's DSRs 330*a*, 330*b*. In a preferred embodiment, the DSDB 107 is a distributed database that deletes the DSR 330*a*, 330*b* by performing overwriting of the database records containing the DSR 330*a*, 330*b*, and overwriting all of the database record replicas in the environment 100.

In some embodiments, the Destruction Engine 217 supports a restoration operation to restore data that was previously deleted from the environment 100. In this case, the Destruction Engine 217 receives a restoration request which includes a previously deleted DSR 330*a*, 330*b*. The Destruction Engine 217 triggers a restoration process. The restoration process inserts the previously deleted DSR 330*a*, 330*b* back into the DSDB 107. In some embodiments, the DSDB 107 is stored within a side database 317 and the restoration process is executed by a restoration smart contract 311. The Destruction Engine 217 sends the DSR 330*a*, 330*b* to the restoration smart contract 311 by including the DSR 330*a*, 330*b* as a transient data field of a transaction. The restoration process inserts the previously deleted DSR 330*a*, 330*b* back into the DSDB 107.

Figure 3:
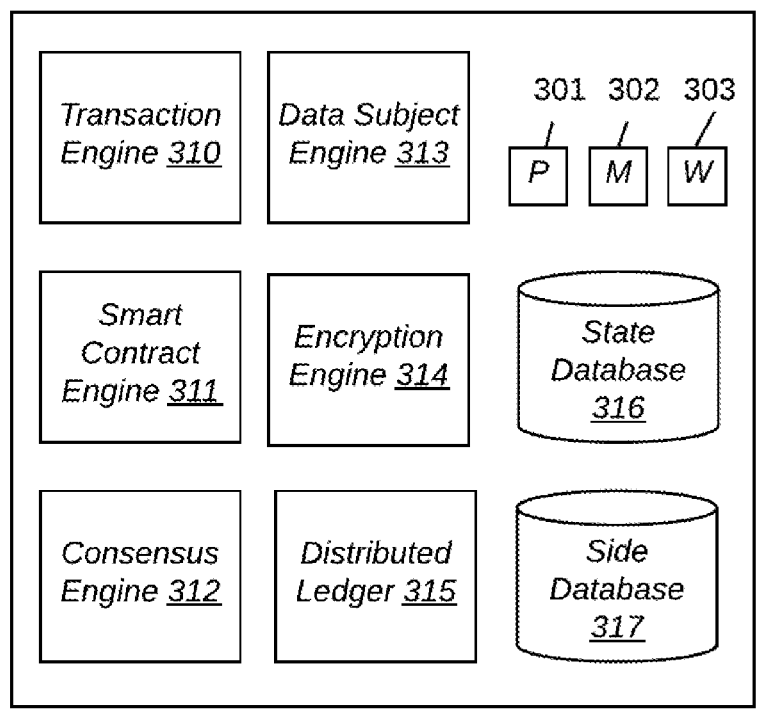
FIG. 3. illustrates an example distributed ledger node and its components.

FIG. 3. illustrates an example distributed ledger node 108, or node, and its components. The node 108 consists of at least a processor 301, memory 302, and private keys stored in a wallet 303. The node 108 communicates with zero or more other nodes 108, one or more servers 109, to operate, maintain, and execute blockchain network services and functions. The node 108 maintains at least a state database 316, and possibly a side database 317. The node 108 executes one or more smart contract workflows 311, possibly including the processes illustrated in FIG. 5, FIG. 6, FIG. 8., a restoration and destruction process.

In some embodiments, the distributed ledger node 108 consists of a number of services that communicate over a network. In some embodiments, the distributed ledger node 108 is managed and deployed using container orchestration software such as Kubernetes. In some embodiments, the distributed ledger node 108 runs the Hyperledger Fabric peer software.

The Transaction Engine 310 receives transactions that have been issued by a server 109. The Transaction Engine 310 validates that the transaction was issued by an authorized server 109 and determines the transaction's destination smart contract 311. The Transaction Engine 310 passes the transaction to the Smart Contract Engine 311 for execution by the destination smart contract. The Transaction Engine 310 receives a transaction execution response from the Smart Contract Engine 311, and forwards this response back to the original server 109 that issued the transaction.

In a preferred embodiment, to validate a transaction the Transaction Engine 310 inspects a digital signature included in the transaction metadata and determines whether the corresponding signing certificate was signed by a pre-configured and approved certificate authority.

The Smart Contract Engine 311 receives a transaction from the Transaction Engine 310 and processes the transaction by executing the destination smart contract workflow, where the transaction payload is an input parameter to the workflow. As part of the execution of the smart contract, the Smart Contract Engine 311 reads from, and writes to, data contained within the State Database 316, and possibly a Side Database 317. The result of the execution of a smart contract with the transaction payload as input is an execution response that is passed back to the Transaction Engine 310. The transaction response includes a flag that indicates whether the smart contract 311 determined that the transaction is valid.

In a preferred embodiment, the Smart Contract Engine 311 executes Smart Contracts that perform the steps illustrated in FIG. 5., FIG. 6., and FIG. 8. In this case, the Smart Contract Engine 311 reads from, and writes to, data stored in a State Database 316. The smart contract 311 executes application specific business logic 810 that has previously been installed on the blockchain network. Additionally, the Smart Contract Engine 311 executes a smart contract that performs data destruction steps, where this process deletes DSRs 330a, 330b stored in the DSDB 107.

In a preferred embodiment, the result of the Smart Contract Engine 311 execution of a transaction is a response message that includes metadata about the data that is read from, and written to, the state database 316. This metadata is also known as a read-write set. The Smart Contract Engine 311 does not immediately update, or commit, the changes to the State Database 316 and Side Database 317. Instead, the Smart Contract Engine 311 passes the read-write set to the Transaction Engine 310 which sends the transaction response to a server 109. The transaction response includes a digital signature over the transaction payload and is signed by the node 108. The transaction response is known as a transaction endorsement. The server 109 subsequently inspects the transaction response to make a determination of whether the transaction updates to the State Database 316 and Side Database 317 should be committed.

The Consensus Engine 312 receives transactions 323a, 323b from other nodes 108 and servers 109 that require ordering and commitment to the distributed ledger 315. The Consensus Engine 312 communicates with zero or more other nodes 108 to determine whether a transaction 323a, 323b is valid, and to generate a block 320a, 320b that includes the transaction 323a, 323b, possibly along with other transactions. This block 320a, 320b is validated by the Consensus Engine 312 and if it is valid then the Consensus Engine 312 appends the block to the distributed ledger 315. The Consensus Engine 312 updates the State Database 316 and possibly the Side Database 317 upon appending a block to the distributed ledger 315. For each of the valid transaction specified in the block, the Consensus Engine 312 applies the resulting State Database 316 and Side Database 317 updates specified in the transaction execution responses, where each response is generated by the Smart Contract Engine 311.

In a preferred embodiment, the Consensus Engine 312 inspects a transaction response generated by the Smart Contract Engine 311 to determine whether the transaction is valid. As part of the validation, the Consensus Engine 312 inspects the digital signatures included in the transaction response, and consults an endorsement policy to determine if the transaction has the necessary digital signatures as required by the policy.

In a preferred embodiment, the Consensus Engine 312 generates a block by triggering a consensus protocol that is executed by an ordering service. Each distributed ledger node 108 that is connected to the network 106 also connects to the ordering service in order for all of the nodes to reach agreement on the next block to be added to the distributed ledger 315, and consequently reach agreement on the distributed ledger 315. The ordering service is possibly executed by the Consensus Engine 312, or by one or more processes running on separate servers. In a preferred embodiment, the ordering service executes a crash fault tolerant consensus protocol using the Apache Kafka and Zookeeper software suite. In some embodiments, the ordering service executes a Byzantine Fault Tolerant consensus protocol, for example the PBFT protocol. In some embodiments, the Consensus Engine 312 implements the ordering service directly by communicating with Consensus Engines 312 on other nodes 108.

The Data Subject Engine 313 provides DSR 330a, 330b lookup 504, 604, creation 505, and deletion functions to processes executed by the Smart Contract Engine 311. In some embodiments, the Data Subject Engine 313 normalizes a DSP 221a, 221b before querying 504, 604 the DSDB 107 contained within and managed by a Side Database 317, for DSRs 330a,330b with matching 223a, 223b DSPs 332a, 332b. For example, the DSP 221a, 221b includes a username and the normalization process converts the username to all lower case. In some embodiments, the Data Subject Engine 313 performs a DSR 330a, 330b lookup by including DSPs 221a, 221b within a search query issued to a search database that generates a ranked list of results that includes DSPs 332a, 332b that are most similar to 221a, 221b. The Data Subject Engine 313 subsequently excludes results that do not meet a minimum relevance threshold, and selects the closest matching DSP 332a, 332b to lookup the corresponding DSR 330a, 330b in the DSDB 107. In some embodiments, the Data Subject Engine 313 communicates with an Elasticsearch database to perform this search operation. In a preferred embodiment, the Data Subject Engine 313 creates 505 new DSRs 330a, 330b and inserts them into the DSDB 107 contained within and managed by a Side Database 317. Specifically, the Data Subject Engine 313 1) creates a new DSP 332a, 332b by copying a DSP 221a, 221b specified in a request message 220a, 220b, 2) generates a new unique DSID 331a, 331b, and 3) generate a new DSK 333a, 333b, 4) place these fields into a new DSR 330a, 330b, and 5) inserts the new DSR into the DSDB 107. In this case, the DSK 333a, 333b is generated by referencing transient data specified within a transaction. In some embodiments, the Data Subject Engine 311 generates DSIDs 331a, 331b by appending a per-transaction counter to a transaction ID.

In some embodiments, the DSDB 107 is not managed by or stored within a side database 317. In this case, when the Data Subject Engine 313 references 504, 604 a DSR 330a, 330*b* it must use DSRs 330*a*, 330*b* included within the transaction's transient data field. The server 109 must include the necessary requested DSRs 330*a*, 330*b* when the Transaction Engine 213 constructs the transaction. Specifically, the server 109 must connect to the DSDB 107, lookup the necessary DSRs 330*a*, 330*b* either using a DSID 331*a*, 331*b* or DSP 221*a*, 221*b*, and include the necessary DSRs 330*a*, 330*b* within the transaction's transient data field. In some embodiments, the Transaction Engine 211 does not know the necessary DSRs 330*a*, 330*b* referenced during the execution of a transaction 311 at the time the transaction is constructed. In this case, in step 504, 604 the Data Subject Engine 311 will pass an error message to the Smart Contract Engine 311 that indicates the DSID 331*a*, 331*b* or DSP 221*a*, 221*b* for the DSR 330*a*, 330*b* missing in the transient data field of the transaction. The Smart Contract Engine 311 passes this error message to the Transaction Engine 310 which generates a transaction execution response that marks the transaction as failed and includes the error message generated by the Data Subject Engine 311. The Transaction Engine 213 on the server 109 receives the failed transaction execution response that includes the error message generated by the Data Subject Engine 311. The Transaction Engine 213 does not submit the failed transaction for commitment and ordering. The Transaction Engine 213 inspects the error message and performs the DSR 330*a*, 330*b* lookup in the DSDB 107 using the DSID 331*a*, 331*b* or DSP 221*a*, 221*b* included in the error message. The Transaction Engine 213 then resubmits the failed transaction, but includes the corresponding missing DSR 330*a*, 330*b*, or indicates that the DSR 330*a*, 330*b* is missing from the DSDB 107 (to perform step 605). The Transaction Engine 310 on the node 108 then continues to process the transaction, as before, but with the necessary DSR 330*a*, 330*b*. This fail-retry process between the node 108 and server 109 continues until either the Smart Contract Engine 311 successfully completes processing the transaction, or a non-recoverable error is raised.

In some embodiments, the DSDB 107 is not managed by or stored within a side database 317. In this case, when the Data Subject Engine 313 creates 505 a DSR 330*a*, 330*b* it must use DSRs 330*a*, 330*b* included within the transaction's transient data field. The server 109 must create and include DSRs 330*a*, 330*b* created in step 505 when the Transaction Engine 213 constructs the transaction. Specifically, the server 109 must connect to the DSDB 107, create a new DSR 330*a*, 330*b* including the DSID 331*a*, 331*b*, DSP 332*a*, 332*b*, and DSK 333*a*, 333*b*, and include the created DSR 330*a*, 330*b* within the transaction's transient data field. In some embodiments, the Transaction Engine 211 does not know the necessary DSRs 330*a*, 330*b* created during the execution of a transaction 311 at the time the transaction is constructed. In this case, in step 505 the Data Subject Engine 311 will pass an error message to the Smart Contract Engine 311 that indicates the DSP 332*a*, 332*b* for the created DSR 330*a*, 330*b* that is missing in the transient data field of the transaction. The Smart Contract Engine 311 passes this error message to the Transaction Engine 310 which generates a transaction execution response that marks the transaction as failed and includes the error message generated by the Data Subject Engine 311. The Transaction Engine 213 on the server 109 receives the failed transaction execution response that includes the error message generated by the Data Subject Engine 311. The Transaction Engine 213 does not submit the failed transaction for commitment and ordering. The Transaction Engine 213 inspects the error message and performs the DSR 330*a*, 330*b* creation in the DSDB 107 using the DSP 332*a*, 332*b* included in the error message. The Transaction Engine 213 then resubmits the failed transaction, but includes the corresponding missing DSR 330*a*, 330*b*. The Transaction Engine 310 on the node 108 then continues to process the transaction, as before, but with the now created DSR 330*a*, 330*b*. This fail-retry process between the node 108 and server 109 continues until either the Smart Contract Engine 311 successfully completes processing the transaction, or a non-recoverable error is raised.

The Encryption Engine 314 provides encryption and decryption functions to processes executed by the Smart Contract Engine 311. Specifically, the Encryption Engine 314 performs encryption 507 and decryption 607 operations using DSKs 333*a*. 333*b* provided by the Data Subject Engine 313 as part of the execution of a smart contract by the Smart Contract Engine 311. In a preferred embodiment, the Encryption Engine 314 uses the AES-256 encryption algorithm to construct the ciphertext that is included in the encrypted message. For each encryption application, the Encryption Engine 314 uses a unique IV by referencing random data included within a transaction's transient data field.

In some embodiments, the encrypted message includes a Hash-based Message Authentication Code over the ciphertext (FLVAC-SHA256). In this case, the DSK 333*a*, 333*b* is used as a master key to derive two server keys using a Key Derivation Function (KDF), one for encryption to generate the cipher text, and the other for generating the HMAC over that ciphertext. In some embodiments, the encrypted message is computed using an Authenticated Encryption with Associated Data (AEAD) algorithm to provide confidentiality, integrity, and authenticity of the encrypted message. For example, using the interface and algorithms specified in IETF RFC 5116.

In some embodiments, the DSK 333*a*, 333*b* is stored on a hardware security module which performs encryption and decryption functions within that module. In this case, the Smart Contract Engine 311 does not pass the DSK 333*a*, 333*b* directly to the Encryption Engine 314, but instead the Smart Contract Engine 311 passes a unique DSK 333*a*, 333*b* identifier which the Encryption Engine 314 passes to the hardware security module to identify the encryption key.

The Distributed Ledger 315 consists of an append only data structure illustrated in FIG. 4. that maintains an ordered list of blocks. Each block 320*a*, 320*b* includes metadata 321*a*, 321*b* with at least a timestamp 332*a*, 322*b* that denotes when the block was generated. Each block 320*a*, 320*b* contains transactions 323*a*, 323*b*, where a transaction 323*a*, 323*b* includes a payload that may include a message that contains a DSID 324*a*, 324*b* and encrypted data subject data 325*a*, 325*b*. The Consensus Engine 312 places transactions within new blocks, and receives new blocks to be appended to the distributed ledger 315. The Distributed Ledger 315 consists of the entire transaction and processing history of the blockchain network, and the smart contract execution 311 of transactions determines the current state of the State Database 316, and when available the Side Database 317.

In a preferred embodiment the block metadata 321*a*, 321*b* includes a block hash which is a cryptographic hash over all of the contents of the block including the block hash of the immediately preceding block. This chain of hashes that links each block to the immediately preceding block forms a blockchain data structure.

The State Database 316 is a database that stores the most recent state that is a result of committing the execution results of the Smart Contract Engine 311 executing all of the valid transactions stored in the Distributed Ledger 315. This state is accessible by processes executed by the Smart Contract Engine 311, which read and write to the State Database 316. In a preferred embodiment, the State Database 316 consists of a LevelDB key-value store. In some embodiments, the State Database 316 consists of a CouchDB key-value database that stores messages in JSON format.

The Side Database 317 is an optional database that stores the most recent state that is a result of committing the execution results of the Smart Contract Engine 311 executing all of the valid transactions stored in the Distributed Ledger 315. Unlike the State Database 316, values read and written to the Side Database 317 are not stored in the Distributed Ledger 315 data structure. Processes executed by the Smart Contract Engine 311 can read and write data to the Side Database 317, but this data is not stored in the Distributed Ledger 315, the State Database 316, or in any append only or immutable data structure. In a preferred embodiment, the Side Database 317 consists of a LevelDB key-value store. In some embodiments, the Side Database 317 consists of a CouchDB key-value database that stores messages in ESON format. In a preferred embodiment, the Side Database 317 stores and maintains the DSDB 107. In this case, DSRs 330a, 330b are records in the Side Database 317. In some embodiments, there does not exist a Side Database 317 in the environment 100. In this case, the DSDB 107 is stored and maintained by a separate database that is not directly managed by the node 108.

FIG. 4. illustrates records, and their arrangement after sensitive data eligible for deletion has been processed by the system. Within an environment 100 there exists one or more distributed ledger nodes 108 that store and maintain a distributed ledger 315. The nodes 108 communicate using distributed ledger protocols 312 to replicate, verify, and maintain the distributed ledger 315. The ledger 315 is a data structure that includes a list of blocks 320a, and 320b that are ordered in time. Blocks 320a, 320b include metadata, with at least a timestamp 322a, 322b that denotes when the block was generated. Blocks 320a, 320b include transactions 323a, 323b that were previously generated by the transaction engine 216. Transactions 323a, 323b may include DSIDs 324a, 324b and encrypted data subject data 325a, 325b, where each DSID 324a, 324b is associated 340a, 340b with a DSK 333a, 333b that the Encryption Engine 314 used to generate the encrypted DSD 325a, 325b. The DSDB 107 contains DSRs 330a, 330b for data subjects, including a DSK 333a, 333b used to encrypt sensitive data belonging to the data subject, and a DSP 332a, 332b that includes information used to identify the data subject. The server 109 processes request messages 220a, 220b which include fields that compose a DSP 221a, 221b which the Data Subject Engine 313 uses to match (223a, 223b) against DSPs 332a, 332b stored in the DSDB 107, and sensitive data that belong to aaa data subject 222a, 222b.

FIG. 5. illustrates an encode process that converts a message into an encoded message. Specifically, the process receives an encode request 501 that includes the message to be encoded. The encode process examines the message to determine the transformation settings, which are a description of which message fields are sensitive and which fields belong to which data subjects. The encode process uses the transformation settings to determine if the message contains sensitive data for a data subject 502. If there is no sensitive data, then the encode process returns the processed message as the encode response to the original caller that issued the request 510. Otherwise, the encode process extracts 503 a data subject profile 221a, 221b from the message, using the message transformation settings, to determine which message fields compose a data subject's DSP 221a, 221b. The encode process uses the extracted DSP 221a, 221b to lookup 504 a corresponding DSR 330a, 330b in the DSDB 107. If there is no matching DSR 330a, 330b in the DSDB 107, then the encode process creates 505 a new DSR 330a, 330b within the DSDB 107. The encode process extracts 506 the DSK 333a, 333b from the DSR 330a, 330b. The encode process uses the extracted DSK 333a, 333b to encrypt 507 the sensitive data belonging to the data subject. The encode process removes the sensitive data for the data subject from the message 508. The encode process then adds 509 the encrypted sensitive data generated in step 507 to the message, and the DSID 331a, 331b of the respective data subject in an unencrypted form, to later facilitate the decode process illustrated in FIG. 6. step 603. The encode process repeats steps 502-509 until all of the sensitive data in the message are removed and the encrypted data is and added to the message, to construct an encoded message. The encode process then returns 510 the encoded message to the original caller that issued the request.

In a preferred embodiment, the encode process is defined in a smart contract that is executed by the Smart Contract Engine 311. In this case, the encode process uses the Data Subject Engine 313 to lookup the DSR in step 504 and create the DSR in step 505. The encode process uses the Encryption Engine 314 to perform step 507. In some embodiments, the encode process is executed on a server 109 which directly accesses a DSDB 107 that is not stored within a Side Database 317. In a preferred embodiment, the encode process examines the message type to lookup the message transformation settings in an application specific predetermined table of transformation settings. An example message transformation setting is illustrated in FIG. 10.

In some embodiments, predetermined transformation settings configured in a lookup table change over time. For example, a network administrator adds a new transformation settings to the lookup table so that an additional field is included as sensitive and included in the DSP 221a, 221b. In some embodiments, a transformation settings lookup table is stored in the State Database 316. In some embodiments, a transformation settings lookup table is included within the transient data field of a transaction. In some embodiments, the message is self-descriptive in that it directly includes the transformation settings and the encode process does not require a predetermined lookup table. In some embodiments, the transformation settings are inferred from the message and from previous messages, using a machine learning algorithm. In a preferred embodiment, the encode process executes a compression step immediately before encrypting the sensitive data in step 507.

FIG. 6. illustrates a decode process that converts a encoded message into its decoded form. The encoded message was previously generated by the process illustrated in FIG. 5., and the decode process attempts to reconstruct the original message prior to the application of the encode process. The decode process receives a decode request 601 from a caller, where the request includes an encoded message. The decode process examines the encoded message 602 to determine if there is encrypted data for a data subject 602, where this encrypted data was previously generated in step 507. If there is no encrypted data within the message, then the processed message is returned as the decode response 610 to the process caller. Otherwise, the decode process extracts 603 the DSID 331a, 331b corresponding to the encrypted data. The decode process then uses the extracted DSID 331a, 331b to look up 604 a corresponding DSR 330a, 330b within the DSDB 107. If there is no corresponding DSR 330a, 330b for the DSID 331a, 331b then the decode process removes 605 the encrypted from the message. Otherwise, the decode process extracts 606 the DSK 333a, 333b from the corresponding DSR 330a, 330b for the extracted DSID 331a, 331b. The decode process uses the extracted DSK 333a, 333b to decrypt 607 the data that was encrypted in step 507. The decode process removes the encrypted data from the message 608, and adds the decrypted data to the message 609. The ecode process repeats steps 602-609 until there are no more encrypted data contained within the message. If the DSR 330a, 3330b does not exist for the encrypted data 605, then the decoded message omits this data.

In a preferred embodiment, the decode process is defined in a smart contract that is executed by the Smart Contract Engine 311. In this case, the decode process uses the Data Subject Engine 313 to lookup the DSR in step 604. The decode process uses the Encryption Engine 314 to perform step 607. In some embodiments, the decode process is executed on a server 109 which directly accesses a DSDB 107 that is not maintained within a Side Database 317. In a preferred embodiment, the decode process operates on an encoded message format that is self descriptive. In other words, a predetermined table of transformation settings is not necessary to perform the decode process. An example self-descriptive encoded message is illustrated in FIG. 11. In a preferred embodiment, the decode process may execute a decompression step immediately after decrypting the data in step 607.

Figure 7:
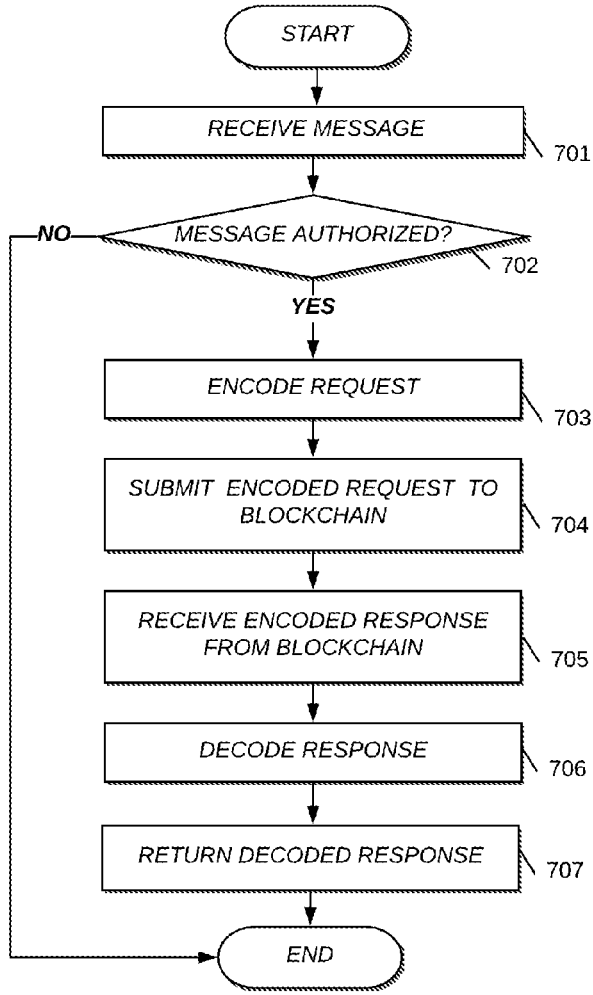
FIG. 7. illustrates an example workflow executed by a Distributed Ledger Oracle Server, where the workflow processes and prepares an encoded request, submits the encoded request to the blockchain network, receives an encoded response, and decodes the response.

FIG. 7. illustrates an example workflow executed by a Distributed Ledger Oracle Server 109, or server. The server's 109 API Engine 210 receives 701 formatted request messages originally issued by one or more devices 102. The server 109 checks that the message is authorized 702 via the Authorization Engine 211. If the request message is not authorized, then the Authorization Engine 211 returns an authorization error to the API Engine 210, and the API Engine 210 forwards the error to the original issuer device 102. Otherwise, the server 109 encodes 703 the request via the Request Encode Engine 212 which triggers the encoding process illustrated in FIG. 5. The server 109 submits 704 the encoded request to the blockchain network via the Transaction Engine 213 to subsequently be processed by a smart contract that executes the steps illustrated in FIG. 8. The server 109 receives 705 an encoded response that contains the smart contract execution results generated in step 811. The server 109 decodes 706 the encoded response via the Response Decode Engine 214 which triggers the decoding process illustrated in FIG. 6. to construct a decoded response. The server 109 returns 707 the decoded response message back to the original issuer device 102 via the API Engine 210.

In a preferred embodiment, the DSDB 107 is contained within, and managed by, a Side Database 317. In this case, both the encoding process triggered in step 703 and illustrated in FIG. 5., and the decoding process triggered in step 706 and illustrated in FIG. 6,. are executed 311 by one or more smart contracts running on one or more nodes 108.

In some embodiments, the DSDB 107 is not contained within, or managed by, a Side Database 317. In this case, both the encoding process triggered in step 703 and illustrated in FIG. 5., and the decoding process triggered in step 706 and illustrated in FIG. 6. are executed by one or more servers 109 that directly access the DSDB 107.

FIG. 8. illustrates an example workflow executed by a Distributed Ledger Node 108, or node. Specifically, the workflow steps illustrated in FIG. 8. are executed by the Smart Contract Engine 311. The Smart Contract Engine 311 receives 801 an encoded request from the Transaction Engine 310, that was issued by the Transaction Engine 213 on a server 109 in step 704. The Smart Contract Engine 311 decodes 802 the request by executing the decode process illustrated in FIG. 6. The Smart Contract Engine 311 uses the Data Subject Engine 313 to perform step 604. The Smart Contract Engine 311 uses the Encryption Engine 314 to perform step 607. The Smart Contract Engine 311 executes 810 application specific business logic to process the decoded request and generate a response. The Smart Contract Engine 311 encodes 811 the response by executing the encode process illustrated in FIG. 5. The Smart Contract Engine 311 uses the Data Subject Engine 313 to perform step 504. The Smart Contract Engine 311 uses the Encryption Engine 314 to perform step 507. The Smart Contract Engine 311 then returns 812 the encoded response back to the Transaction Engine 310 as the execution response. As part of the execution of application specific business logic 810, this logic may read 803 or write 807 sensitive data pertaining to a data subject to the State Database 316. In the write case 807, the Smart Contract Engine 311 executes 808 the encode process illustrated in FIG. 5. to construct an encoded message, writes 809 this encoded message to the State Database 316, and continues processing thee application specific business logic 810. In the read case 803, the Smart Contract Engine 311 reads 804 an encoded message from the state database, decodes 805 the message by executing the decode process illustrated in FIG. 6., and continues processing the decoded message using the application specific business logic 810.

FIG. 9. illustrates an example message that contains sensitive data (name and birthday) for two different users, Ben and Tom. For example, this message is a request received by the API Engine 210 in step 701, or is a message within a write request in step 807. This message is not self-descriptive, in that a separate transformation settings message illustrated in FIG. 10. is necessary in order for the encode process illustrated in FIG. 5. to generate an encoded message.

FIG. 10. illustrates example transformation settings for messages in the format illustrated in FIG. 9., and are used by the encoding process illustrated in FIG. 5. For example, the encode process illustrated in FIG. 5. when applied to the example message in FIG. 9. with transformation settings illustrated in FIG. 10. results in an example encoded message illustrated in FIG. 11. The transformation settings in FIG. 10. define sensitive data for two data subjects using the "private paths" fields. Specifically, the "Name" and "Birthday" field in the first request object belong to the first data subject, and the "Name" and "Birthday" field in the second request object belong to the second data subject. The transformation settings reference fields within the message (e.g., ".Requests[0]") using a path notation, for example JSON Path. The transformation settings in FIG. 10. use the "encryptor" field to specify that the encode process must use AES-256 encryption for sensitive data contained within the first and second request objects. Similarly, the transformation settings in FIG. 10. use the "compressor" field to specify that the encode process must use the "zlib" compression algorithm to compress the sensitive data in the first and second request objects prior to encrypting the sensitive data. The "profile paths" fields define which fields in the message are used to extract the DSP in step 503. In this case the "Name" field in the first request is used to construct the DSP 221a for the first data subject, and the "Name" field in the second request is used to construct the DSP 221b for the second data subject. Specifically, when the encoding process illustrated in FIG. 5. is applied to the example message in FIG. 9. the encoding process uses "Ben Franklin" as the DSP 221a to look up the first DSR 330a, and "Tom Jefferson" as the DSP 221b to look up the second DSR 330b.

FIG. 11. illustrates an example encoded message that is a result of the encoding process illustrated in FIG. 5. when applied to an example message illustrated in FIG. 9. Using the example transformation settings illustrated in FIG. 10. The encoded message is self-descriptive, in that it includes the information necessary for the decode process illustrated in FIG. 6. to decode the encoded message. Specifically, the process constructs the original message illustrated in FIG. 9. where the encrypted data 325a, 325b has corresponding DSRs 330a, 330b (and DSKs 333a, 333b) available within the DSDB 107. In other words, if the DSRs 330a, 330b have been deleted via the destruction process, then the decode process does not include the sensitive data corresponding to those DSRs 330a, 330b within the decoded message. The example encoded message includes a header field "mxf" to indicate to the decode process the format of the encoded message. The "message" field specifies the original message illustrated in FIG. 9., but with the sensitive data (names and birthdays) removed. The "transforms" field specifies transformation settings, DSIDs 324a, 324b, and encrypted data 325a, 325b corresponding to those DSIDs. The decode process illustrated in FIG. 6. uses the DSID specified in the "dsid" field to extract the DSID in step 603.

FIG. 12. illustrates pseudo-code to demonstrate how the sensitive details (["Ben Franklin", "17Jan1706"]) for the Ben Franklin data subject are compressed using zlib compression and encrypted using AES-256 encryption. Specifically, the encode process illustrated in FIG. 5. looks up a DSR 330a for Ben Franklin containing a DSK 333a with value "Here I stand, I can do no other" The encode process includes an initialization vector (IV) as part of the encryption process that is included directly in the encrypted message. FIG. 12. also illustrates pseudo-code to demonstrate how the encrypted sensitive details for the Ben Franklin data subject are decrypted using AES-256 decryption and decompressed using zlib decompression, to reconstruct the sensitve details (["Ben Franklin", "17Jan1706"]).

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. An immutable distributed ledger system, comprising:
a distributed ledger oracle server;
a plurality of distributed ledger nodes connected to the distributed ledger oracle server over a network, the plurality of distributed ledger nodes implementing an immutable distributed ledger that stores data corresponding to a data subject, a data subject record and a data subject key that corresponds to the data subject, wherein the data subject record and data subject key are stored in a data subject database of the immutable distributed ledger system;
the distributed ledger oracle server having a destruction engine that comprises a plurality of instructions executed by a processor of the distributed ledger oracle server that is configured to:
receive a delete request that identifies a data subject to be deleted; and
delete, from the data subject database, the data subject record for the data subject to be deleted to make the data corresponding to the data subject to be deleted inaccessible to the immutable distributed ledger system in response to a delete request.

2. The system of claim 1, wherein the processor is further configured to delete the data subject record and the data subject key of the data subject to be deleted.

3. The system of claim 1, wherein the processor is further configured to receive the delete request having a data subject identifier of the data subject to be deleted.

4. The system of claim 3, wherein the processor is further configured to look up the data subject identifier of the data subject to be deleted and delete the data subject record and the data subject key of the data subject to be deleted.

5. The system of claim 1, wherein the processor is further configured to receive the delete request having a data subject profile of the data subject to be deleted.

6. The system of claim 5, wherein the processor is further configured to look up the data subject profile of the data subject to be deleted and delete the data subject record and the data subject key of the data subject to be deleted.

7. The system of claim 1, wherein the processor further comprises a destruction smart contract that is part of the immutable distributed ledger system to make the data corresponding to a data subject to be deleted inaccessible to the immutable distributed ledger system.

8. The system of claim 1, wherein the processor is further configured to:
restore a previously deleted data subject record so that the data corresponding to the data subject is accessible by the immutable distributed ledger environment.

9. The system of claim 8, wherein the processor is further configured to receive a restore request that includes the data subject record of the previously deleted data subject.

10. The system of claim 9, wherein the processor is further configured to insert, into the data subject database of the immutable distributed ledger system, the data subject record and data subject key of the previously deleted data subject.

11. The system of claim 8, wherein the processor is further configured to use a restore smart contract that is part of the immutable distributed ledger environment to make the data corresponding to the data subject accessible to the immutable distributed ledger environment.

12. The system of claim 1 further comprising a computing device having a graphical user interface that generates the delete request.

13. The system of claim 12, wherein the computing device having a graphical user interface generates the restore request.

14. A method, comprising:
providing data corresponding to a data subject that is stored in an immutable distributed ledger environment, wherein the data corresponding to a data subject comprises a data subject record and a data subject key stored in the data subject database of the immutable distributed ledger environment;
receiving, at a destruction engine that is part of the immutable distributed ledger environment, a delete request that identifies the data subject to be deleted;
making, with the destruction engine that is part of the immutable distributed ledger environment, the data corresponding to the data subject to be deleted inaccessible to the immutable distributed ledger environment in response to the delete request; and
restoring access to the data corresponding to the data subject to be deleted by inserting the data subject back into the data subject database.

15. The method of claim 14, wherein making the data corresponding to the data subject to be deleted inaccessible to the immutable distributed ledger environment further comprises deleting the data subject record and the data subject key of the data subject to be deleted.

16. The method of claim 14, wherein the delete request that identifies the data subject to be deleted further comprises a data subject identifier of the data subject to be deleted.

17. The method of claim 16, wherein making the data corresponding to the data subject to be deleted inaccessible to the immutable distributed ledger environment further comprises looking up the data subject identifier of the data subject to be deleted and deleting the data subject record and the data subject key of the data subject to be deleted.

18. The method of claim 14, wherein the delete request that identifies the data subject to be deleted further comprises a data subject profile of the data subject to be deleted.

19. The method of claim 18, wherein making the data subject to be deleted inaccessible to the immutable distributed ledger environment further comprises looking up the data subject profile of the data subject to be deleted and deleting the data subject record and the data subject key of the data subject to be deleted.

20. The method of claim 14, wherein making the data subject to be deleted inaccessible to the immutable distributed ledger environment further comprises using a destruction smart contract that is part of the immutable distributed ledger environment to make the data subject to be deleted inaccessible to the immutable distributed ledger environment.

21. The method of claim 14 further comprising restoring, with the destruction engine that is part of the immutable distributed ledger environment, a previously deleted data subject so that the data corresponding to the data subject is accessible by the immutable distributed ledger environment.

22. The method of claim 21, wherein restoring the previously deleted data subject further comprises receiving, at the destruction engine that is part of the immutable distributed ledger environment, a restore request that includes the data subject record of the previously deleted data subject.

23. The method of claim 22, wherein restoring the previously deleted data subject further comprises inserting, into the data subject database of the immutable distributed ledger environment, the data subject record and the data subject key of the previously deleted data subject.

24. The method of claim 21, wherein restoring the previously deleted data subject further comprises using a restore smart contract that is part of the immutable distributed ledger environment to make the data corresponding to the data subject accessible to the immutable distributed ledger environment.

* * * * *